(12) United States Patent
Rozental

(10) Patent No.: US 7,969,873 B2
(45) Date of Patent: Jun. 28, 2011

(54) DATA TRANSMISSION SCHEME WITH SCHEDULING OPTIMIZATION FOR PHYSICAL CHANNEL GROUP

(75) Inventor: Roman Rozental, Netania (IL)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 12/208,304

(22) Filed: Sep. 10, 2008

(65) Prior Publication Data

US 2009/0003384 A1 Jan. 1, 2009

Related U.S. Application Data

(63) Continuation-in-part of application No. 11/165,174, filed on Jun. 22, 2005, now Pat. No. 7,567,620.

(51) Int. Cl.
*H04L 12/56* (2006.01)
(52) U.S. Cl. ........................ 370/230; 370/395.4; 370/414
(58) Field of Classification Search ........................ None
See application file for complete search history.

(56) References Cited

U.S. PATENT DOCUMENTS

| | | | | |
|---|---|---|---|---|
| 5,592,476 | A * | 1/1997 | Calamvokis et al. | ......... 370/390 |
| 7,292,580 | B2 * | 11/2007 | Ramamurthy et al. | .. 370/395.42 |
| 7,606,154 | B1 * | 10/2009 | Lee | ................................ 370/232 |
| 7,751,317 | B2 * | 7/2010 | Toyama et al. | ................ 370/230 |
| 2006/0015917 | A1 | 1/2006 | Rozental | ........................ 725/111 |
| 2007/0047553 | A1 * | 3/2007 | Matusz et al. | ........... 370/395.42 |

OTHER PUBLICATIONS

IEEE Standard 802.3 Part 3: Carrier sense multiple access with collision detection (CSMA/CD) access method and physical layer specifications, Mar. 8, 2002, pp. 285-292.

* cited by examiner

*Primary Examiner* — Kwang B Yao
*Assistant Examiner* — Alex Skripnikov
(74) *Attorney, Agent, or Firm* — Grossman, Tucker, Perreault & Pfleger PLLC

(57) ABSTRACT

A novel apparatus for and a method of optimized data transmission whereby an input data stream is distributed over a plurality of physical channels within a logical channel group. Transmission of data over the channel group appears as transmission over a single logical channel having a bandwidth approximately equal to the sum of the physical channel bandwidths. The physical channels making up the logical channel group may have different bandwidth capacities. The method of data unit distribution among a plurality of physical channels generates several transmission plans for scheduling data units, which may have difference lengths, over the physical channels where the data stream is composed of data units from different sessions. A best plan according to one or more optimization criteria is selected and used for distribution of the data units. The original order of transmission of the data units can be reproduced for each data session at the receiving side without the need for additional fields or modification of existing fields of the data units.

8 Claims, 15 Drawing Sheets

DATA TRANSMISSION SCHEME WITH SCHEDULING OPTIMIZATION FOR PHYSICAL CHANNEL GROUP

REFERENCE TO PRIORITY APPLICATION

This application is a continuation-in-part of U.S. application Ser. No. 11/165,174, filed Jun. 22, 2005, now U.S. Pat. No. 7,567,620, entitled "Data Transmission Scheme Using Channel Group and DOCSIS Implementation Thereof", incorporated herein by reference in its entirety.

FIELD OF THE INVENTION

The present invention relates to the field of data communications and more particularly relates to an apparatus for method of transmitting a data stream which optimizes the distribution of data units over a plurality of physical channels within a channel group.

BACKGROUND OF THE INVENTION

Multiplexing is a conventional technique well known in the communication arts. In conventional multiplexing, several input data streams are combined or merged (i.e. multiplexed) into a single output stream and transmitted over a single channel. Typically, the communications channel is of a substantially higher data rate than the data rate of any of the input data streams. Multiplexing is an effective technique that is used to reduce the number of separate links required to transmit information from multiple sources from one point to another.

Inverse multiplexing is also a technique well known in the communication arts. In this technique, rather than combine data from separate sources into a single output stream, data from one source is split into multiple streams. Inverse multiplexing is often used in cases where high-speed links are not available to carry a high rate data stream. Rather than transmit the data over a single link, the input data is split into multiple streams and transmitted over several links that may be at a lower rate than the input. Inverse multiplexing is used, for example, with Gigabit Ethernet wherein a 1 Gbps stream is split into and transmitted over four separate links of 250 Mbps each. At the transmitter, the input stream is split into a plurality of slower output streams, each output stream is transmitted and collected at the receiver where they are all combined to reproduce the original data stream.

To implement inverse multiplexing, most systems modify the packets or frames before they are sent over the separate links. The modifications made typically include the insertion of labels, indications, sequence numbers, etc. that are required for the receiver to be able to determine the original order of the packets. Without the packet modifications, the receiver would not know how to combine (i.e. reproduce the original order of) the packets it receives over the separate links.

A problem with this prior art scheme, however, is that in some systems it is not practical or not permitted to modify packets for transmission over the separate links. Thus, prior art inverse multiplexing techniques cannot be used in systems that do not permit modifications to the packets. Further, it is undesirable to use such schemes in systems where packet modification during transmission/receiving reduces system performance.

The IEEE 802.3ad-2000 standard entitled "Amendment to Carrier Sense Multiple Access with Collision Detection (CMSA/CD) Access Method and Physical Layer Specifications—Aggregation of Multiple Link Segments" describes a data transmission scheme. The major disadvantages of this scheme are (1) the standard contemplates many data substreams (i.e. conversations) in the stream and (2) each substream can use only one physical channel. Thus, traffic balancing is very restricted and in the case of one substream in the stream, no parallel transmission occurs at all.

There is thus a need for a scheme that is capable of transmitting in an optimized fashion an input data stream over a plurality of links and recombining the separate streams at the receiver without requiring any modifications to be made to the packets and that also permits the grouping of physical channels without regard to their bandwidth capacities.

SUMMARY OF THE INVENTION

The present invention is a novel apparatus for and a method of data transmission whereby an input data stream transmission plan is optimized (or at least improved) over a plurality of physical channels within a logical channel group. Transmission of data over the channel group appears as transmission over a single logical channel having a bandwidth approximately equal to the sum of the physical channel bandwidths. In accordance with the invention, the physical channels making up the logical channel group may have different bandwidth capacities while data units may have variable length.

The data transmission scheme of the present invention is presented with application to any suitable communications system. In addition, the data transmission scheme is presented as applied to a DOCSIS enabled communications system.

The invention comprises a method of distributing data unit streams among a plurality of physical channels. Two important aspects of the invention include (1) the consideration of the bandwidth capacities of the individual physical channels in implementing the distribution algorithm (load balancing), (2) the capability of reproducing the order of the transmission of the data units on the receiving side without the need for additional fields or modification of existing fields of the data units, (3) the possibility to continue receiving data after traffic hits and (4) the possibility to join new traffic receivers with delay after transmission start.

The method of the present invention implements a transmission scheduling mechanism whereby the transmitter and the receiver need to decide for each data unit only whether to transmit/receive a data unit using the current channel or to switch to the next channel in the channel pool (i.e. the channel group). This decision is made considering the value of a bandwidth parameter and current 'credit' counter associated with each channel. Once a determination is made to switch to the next channel, data transmission scheduling ceases on the current channel and scheduling continues using the next channel in the cyclical channel pool. Note that the receiver implements an algorithm similar to that of the transmitter in order to determine how many data units to receive over any particular channel.

Optimized transmission is provided whereby the transmitter generates several transmission plans for input data blocks containing multiple data units. Each transmission plan includes the transmission scheduling of data units for each of the physical channels in a channel group. The schedules are created, for example, so that longer data units are scheduled to faster physical channels, or to load the transmit queues of physical channels to achieve close to ideal transmit time for a data block. A best plan from among the transmission plans is selected based on one or more optimization criteria and the input data units are transmitted over the physical channels in accordance with the selected transmission plan.

The data transmission of the present invention has several advantages. These include (1) the data unit length may be variable; (2) the bandwidths of the data channels need not be the same; (3) distribution of data units between channels is optimized and more flexible within a channel group than compared to IEEE 802.3ad specification; (4) the scheme does not require labels to be inserted into the data units in order to reconstruct the original stream at the receiver; (5) the scheme provides load balancing between channels in the group obviating the need for separate load balancing mechanism; and (6) the channels in a channel group may have different (but constant) downstream transmission profiles, with no restrictions for the downstream profile combinations in the channel group.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of optimizing data transmission over a channel group having a plurality of physical channels, the method comprising the steps of receiving an input stream of data units to be transmitted over the channel group, generating a plurality of transmission plans, whereby longer data units are assigned to faster physical channels, each transmission plan including a transmission schedule for data units over each physical channel, selecting a best transmission plan from the plurality of transmission plans based on one or more optimization criteria and transmitting the input data units over the channel group in accordance with the selected transmission plan.

There is also provided in accordance with the invention, a method of optimizing data transmission over a channel group having a plurality of physical channels, the method comprising the steps of receiving an input stream of data units to be transmitted over the channel group, calculating an ideal time for data block transmission, generating a plurality of transmission plans, whereby transmission queues of physical channels are loaded so as to yield transmission times for data blocks as close as possible to the ideal time, each transmission plan including a transmission schedule for data units over each physical channel, selecting a best transmission plan from the plurality of transmission plans based on one or more optimization criteria and transmitting the input data units over the channel group in accordance with the selected transmission plan.

There is further provided in accordance with the invention, a method of optimizing data transmission over a channel group having a plurality of physical channels, the method comprising the steps of looping over all physical channels in the channel group, for each channel: allocating transmission resources to the channel, attempting to transmit data units previously placed in a suspended queue, sending data units from an input queue if sufficient transmission resources exist for the channel and placing data units from the input queue unable to be sent into the suspended queue for transmission over a different channel.

There is also provided in accordance with the invention, a method of optimizing data transmission over a channel group having a plurality of physical channels, the method comprising the steps of scheduling data units previously placed in a suspended queue for transmission over a physical channel if the channel has sufficient bandwidth and scheduling unsuspended data units in an input queue for transmission over a physical channel if one or more predetermined criteria are met, otherwise placing the data units in the suspended queue for transmission over a different physical channel.

There is further provided in accordance with the invention, an apparatus for optimizing data transmission over a channel group having a plurality of physical channels comprising an input queue for receiving an input stream of data units to be transmitted over the channel group, a suspended queue for storing data units retrieved from the input queue but not able to be sent over a particular channel, a transmission plan generator operative to: generate a plurality of transmission plans wherein each transmission plan includes a schedule for transmitting data units over each physical channel, generate the schedule by attempting to transmit data units previously placed in the suspended queue, attempting to send unsuspended data units in the input queue, and if the unsuspended data units cannot be sent, placing the unsuspended data units in the suspended queue for transmission over a different channel, select a best transmission plan from the plurality of transmission plans based on one or more optimization criteria and transmit scheduled data units over the channel group in accordance with the selected transmission plan.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
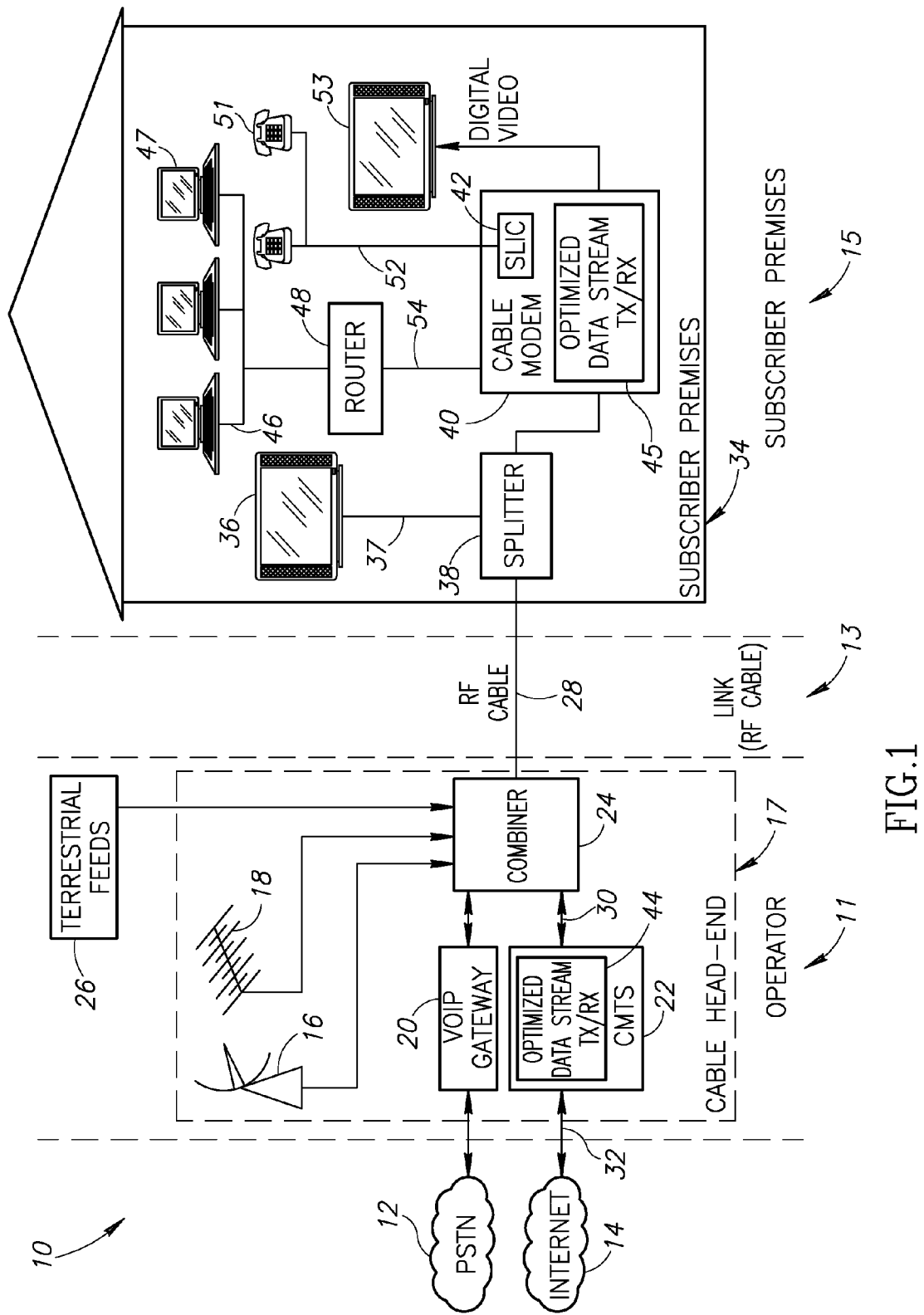
FIG. 1 is a block diagram illustrating an example cable modem system incorporating the transmission optimization mechanism in CMTS and cable modem components of the present invention.

The following notation is used throughout this document.

| Term | Definition |
| --- | --- |
| AC | Alternating Current |
| ADC | Analog to Digital Converter |
| ASIC | Application Specific Integrated Circuit |
| ATM | Asynchronous Transfer Mode |
| AVI | Audio Video Interface |
| BMP | Windows Bitmap |
| BWA | Broadband Wireless Access |
| CATV | Community Antenna Television or Cable TV |
| CBW | Capture Bandwidth |
| CM | Cable Modem |
| CMTS | Cable Modem Termination System |
| CO | Central Office |
| CPU | Central Processing Unit |
| CRC | Cyclic Redundancy Code |
| DAC | Digital to Analog Converter |
| DC | Direct Current |
| DECT | Digital Enhanced Cordless Telecommunications |
| DHCP | Dynamic Host Control Protocol |
| DOCSIS | Data Over Cable Service Interface Specification |
| DS | Downstream |
| DSL | Digital Subscriber Line |
| DSP | Digital Signal Processor |
| DVR | Digital Video Recorder |
| ECM | Embedded Cable Modem |
| EDGE | Enhanced Data rates for GSM Evolution |
| EEPROM | Electrically Erasable Programmable Read Only Memory |
| EEROM | Electrically Erasable Read Only Memory |
| EMTA | Embedded Multimedia Terminal Adapter |
| EPROM | Erasable Programmable Read Only Memory |
| EVDO | Evolution-Data Optimized |
| FPGA | Field Programmable Gate Array |
| GPIO | General Purpose I/O |
| GSM | Global System for Mobile Communication |
| HDL | Hardware Description Language |
| HFC | Hybrid Fiber Coaxial |
| I/F | Interface |
| I/O | Input/Output |
| IC | Integrated Circuit |
| IP | Internet Protocol |
| JPG | Joint Photographic Experts Group |
| LAN | Local Area Network |
| LED | Light Emitting Diode |
| LTE | Long Term Evolution |
| MAC | Media Access Control |
| MP3 | MPEG-1 Audio Layer 3 |
| MPEG | Moving Picture Experts Group |
| MPG | Moving Picture Experts Group |
| MSO | Multiple System Cable Operator |
| PC | Personal Computer |
| PDA | Personal Digital Assistant |
| PGA | Programmable Gain Amplifier |
| POTS | Plain Old Telephone Service |
| PSTN | Public Switched Telephone Network |
| QAM | Quadrature Amplitude Modulation |
| QoS | Quality of Service |
| RAM | Random Access Memory |
| RAT | Radio Access Technology |
| RF | Radio Frequency |
| ROM | Read Only Memory |
| SLIC | Subscriber Line Interface Card |
| SNMP | Simple Network Management Protocol |
| SONET | Synchronous Optical Network |
| TB | Tuning Band |
| UMB | Ultra Mobile Broadband |
| UMTS | Universal Mobile Telecommunications System |
| US | Upstream |
| USB | Universal Serial Bus |
| VoIP | Voice over IP |
| WAN | Wide Area Network |
| WCDMA | Wideband Code Division Multiple Access |
| WiFi | Wireless Fidelity |
| WiMAX | Worldwide Interoperability for Microwave Access |
| WLAN | Wireless Local Area Network |
| WMA | Windows Media Audio |
| WMV | Windows Media Video |

DETAILED DESCRIPTION OF THE INVENTION

The present invention is a novel apparatus for and a method of data transmission whereby an input data stream distribution is optimized over a plurality of physical channels within a logical channel group. Transmission of data over the channel group appears as transmission over a single logical channel having a bandwidth approximately equal to the sum of the physical channel bandwidths. In accordance with the invention, the physical channels making up the logical channel group may have different bandwidth capacities.

The data transmission scheme of the present invention is presented with application to any suitable communications system. In addition, the data transmission scheme is presented as applied to a DOCSIS enabled communications system.

The invention comprises a method of optimized data unit distribution among a plurality of physical channels. Several important aspects of the invention include (1) the consideration of the bandwidth capacities of the individual physical channels in implementing the distribution algorithm, (2) the capability of reproducing the order of the transmission of the data units on the receiving side without the need for additional fields or modification of existing fields of the data units, (3) the capability of continuing to receive data after traffic hits and (4) the capability of joining new traffic receivers with a delay after starting transmission.

To aid in understanding the principles of the present invention, the description is provided in the context of a Data-Over-Cable Service Interface Specification (DOCSIS) enabled communications system, in particular DOCSIS 3.0 systems which support data transmission over N (e.g., four) physical channels. It is appreciated, however, that the invention is not limited to use with any particular communication standard and may be used in cable, optical, wired, wireless or other applications. Further, the invention is not limited to use with a specific modulation scheme but is applicable to any modulation scheme including both digital and analog modulation. The invention is applicable to any system in which it is desirable to transfer a data stream in parallel in an optimized manner over a plurality of physical channels wherein the nature of and the capacities of each channel may vary and where the fields of the data units may not be modified or added to in order to reproduce at the receiver the original data stream.

Note that throughout this document, the term communications transceiver, communications device or network device is defined as any apparatus or mechanism adapted to transmit, receive or transmit and receive information through a medium. The communications device, communications transceiver or network device may be adapted to communicate over any suitable medium, including wireless or wired media. Examples of wireless media include RF, infrared, coaxial, optical, microwave, UWB, Bluetooth, WiMAX, GSM, EDGE, UMTS, WCDMA, 3GPP-LTE, CDMA-2000, EVDO, EVDV, UMB, WiFi, or any other broadband medium, radio access technology (RAT), etc. Examples of wired media include twisted pair, coaxial, optical fiber, any wired interface (e.g., USB, Firewire, Ethernet, etc.). The terms communications channel, link and cable are used interchangeably. The terms communications device, communications transceiver or network device are also intended to denote other devices including, but not limited to, a set top box, cable modem, EMTA, residential gateway cable device, embedded cable modem, a multimedia player, mobile communication device, cellular phone, node in a broadband wireless access (BWA) network, smartphone, PDA, wireless LAN (WLAN) and Bluetooth device.

The term cable modem is defined as a modem that provides access to a data signal sent over the cable television infrastructure. The term voice cable modem is defined as a cable modem that incorporates VoIP capabilities to provide telephone services to subscribers.

The term 'essential code' is defined as code required to enable the communication device to boot and repeatedly attempt to download and install the full-functionality software upgrade until it is successfully installed. The term 'nonessential' code refers to all other code including not only operating system software, but other code for proper operation of the cable modem, such as in a DOCSIS compliant manner.

The word 'exemplary' is used herein to mean 'serving as an example, instance, or illustration.' Any embodiment described herein as 'exemplary' is not necessarily to be construed as preferred or advantageous over other embodiments.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.) and/or other content widely identified as multimedia. The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Cable System Incorporating Transmission Optimization Mechanism

A block diagram illustrating an example cable modem system incorporating the transmission optimization mechanism of the present invention is shown in FIG. 1. The system, generally referenced 10, comprises an operator portion 11 connected to the public switched telephone network (PSTN) 12 and the Internet 14 or other wide area network (WAN), a link portion 13 comprising the RF cable 28 and a subscriber portion 15 comprising the subscriber premises 34.

The operator portion 11 comprises the cable head-end 17 which is adapted to receive a number of content feeds such as satellite 16, local antenna 18 and terrestrial feeds 26, all of which are input to the combiner 24. The cable head-end also comprises the voice over IP (VoIP) gateway 20 and Cable Modem Termination System (CMTS) 22. The combiner merges the TV programming feeds with the RF data from the CMTS.

The Cable Modem Termination System (CMTS) is a computerized device that enables cable modems to send and receive packets over the Internet. The IP packets are typically sent over Layer 2 and may comprise, for example, Ethernet or SONET frames or ATM cell. It inserts IP packets from the Internet into MPEG frames and transmits them to the cable modems in subscriber premises via an RF signal. It does the reverse process coming from the cable modems. A DOCSIS-compliant CMTS enables customer PCs to dynamically obtain IP addresses by acting as a proxy and forwarding DHCP requests to DHCP servers. A CMTS may provide filtering to protect against theft of service and denial of service attacks or against hackers trying to break into the cable operator's system. It may also provide traffic shaping to guarantee a specified quality of service (QoS) to selected customers. A CMTS may also provide bridging or routing capabilities.

In accordance with one embodiment of the invention, the CMTS comprises an optimized data stream transmit/receive block 44 which functions to improve transmit and/or receive data units processed over a plurality of physical channels to subscriber premises using the transmission optimization mechanism of the present invention, described in more detail infra.

The subscriber premises 34 comprises a splitter 38, cable appliances 36 such as televisions, DVRs, etc., cable modem 40, router 48, PCs or other networked computing devices 47 and telephone devices 51. Cable service is provided by the local cable provider wherein the cable signal originates at the cable head end facility 17 and is transmitted over RF cable 28 to the subscriber premises 34 where it enters splitter 38. One output of the splitter goes to the televisions, set top boxes, and other cable appliances via internal cable wiring 37.

The other output of the splitter comprises the data portion of the signal which is input to the cable modem 40. The cable modem is adapted to provide both Ethernet and USB ports. Typically, a router 48 is connected to the Ethernet port via Ethernet cable 54. One or more network capable computing devices 47, e.g., laptops, PDAs, desktops, etc. are connected to the router 48 via internal Ethernet network wiring 46. In addition, the router may comprise or be connected to a wireless access point that provides a wireless network (e.g., 802.11b/g/a) throughout the subscriber premises.

The cable modem also comprises a subscriber line interface card (SLIC) 42 which provides the call signaling and functions of a conventional local loop to the plurality of installed telephone devices 51 via internal 2-wire telephone wiring 52. In particular, it generates call progress tones including dial tone, ring tone, busy signals, etc. that are normally provided by the local loop from the CO. Since the telephone deices 51 are not connected to the CO, the SLIC in the cable modem must provide these signals in order that the telephone devices operate correctly.

In accordance with another embodiment of the invention, the cable modem comprises an optimized data stream transmit/receive block 45 which functions to improve the data unit transmit and/or receive process over a plurality of physical channels to the CMTS using the transmission optimization mechanism of the present invention, described in more detail infra.

A digital video output signal generated by the cable modem is displayed to the user (i.e. cable subscribers) via television set 53 (i.e. video display device or other cable appliance). Tuner circuits in the cable modem enable the reception of multiple video channels simultaneously.

Cable Modem Incorporating Transmission Optimization Mechanism

Figure 2:
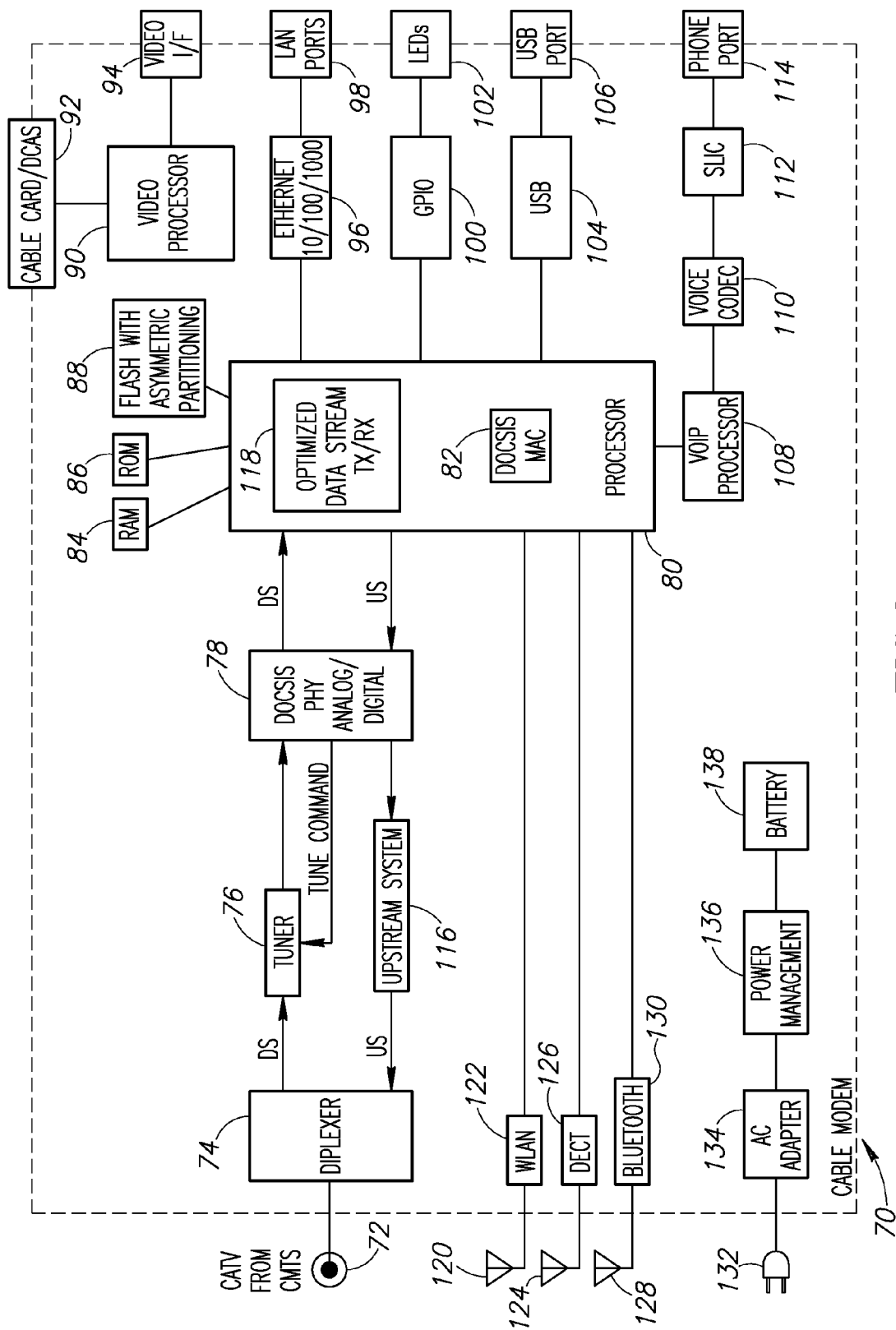
FIG. 2 is a block diagram illustrating an example cable modem incorporating the transmission optimization mechanism of the present invention.

A block diagram illustrating an example cable modem incorporating the transmission optimization mechanism of the present invention is shown in FIG. 2. The cable modem, generally referenced 70, comprises an upstream system and a downstream system. The downstream system comprises a duplexer 74, tuner 76 and DOCSIS PHY circuit 78. The upstream system comprises the DOCSIS PHY circuit 78, upstream system circuit 116 and diplexer 74.

The cable modem also comprises DOCSIS compatible processor 80, DOCSIS MAC 82, VoIP processor 108, voice codec 110, subscriber line interface card (SLIC) 112, phone port 114, wireless local area network (WLAN) 122 and associated antenna 120, DECT 126 and associated antenna 124, Bluetooth 130 and associated antenna 128, Ethernet interface 96, Ethernet LAN port 98, general purpose input/output (I/O) (GPIO) interface 100, LEDs 102, universal serial bus (USB) interface 104, USB port 106, cable card/Downloadable Conditional Access Systems (DCAS) 92, video interface (I/F) 94, video processor 90, AC adapter 134 coupled to mains utility power via plug 132, power management circuit 136, battery 138, RAM, 84, ROM 86 and flash memory 88.

Note that in the example embodiment presented herein, the cable modem and DOCSIS enabled processor are adapted to implement the DOCSIS 3.0 standard which provides for multiple channel video reception. It is appreciated, however, that the invention is not limited to use in a DOCSIS compatible cable modem but is applicable to numerous other differential amplifier circuit applications as well.

In operation, the cable modem processor is the core chip set which in the example presented herein comprises a central single integrated circuit (IC) with peripheral functions added. The voice over IP (VoIP) processor 108 implements a mechanism to provide phone service outside the standard telco channel. Chipset DSPs and codecs 110 add the functionality of POTS service for low rate voice data.

The cable modem also comprises a subscriber line interface card (SLIC) 112 which functions to provide the signals and functions of a conventional local loop to a plurality of telephone devices connected via the phone port 114 using internal 2-wire telephone wiring. In particular, it generates call progress tones including dial tone, ring tone, busy signals, etc. that are normally provided by the local loop from the CO. Since the telephone deices are not connected to the CO, the SLIC in the cable modem must provide these signals in order that the telephone devices operate correctly.

In a traditional analog telephone system, each telephone or other communication device (i.e. subscriber unit) is typically interconnected by a pair of wires (commonly referred to as tip and ring or together as subscriber lines, subscriber loop or phone lines) through equipment to a switch at a local telephone company office (central office or CO). At the CO, the tip and ring lines are interconnected to a SLIC which provides required functionality to the subscriber unit. The switches at the central offices are interconnected to provide a network of switches thereby providing communications between a local subscriber and a remote subscriber.

The SLIC is an essential part of the network interface provided to individual analog subscriber units. The functions provided by the SLIC include providing talk battery (between 5 VDC for on-hook and 48 VDC for off-hook), ring voltage (between 70-90 VAC at a frequency of 17-20 Hz), ring trip, off-hook detection, and call progress signals such as ringback, busy, and dial tone.

A SLIC passes call progress tones such as dial tone, busy tone, and ringback tone to the subscriber unit. For the convenience of the subscriber who is initiating the call, these tones normally provided by the central office give an indication of call status. When the calling subscriber lifts the handset or when the subscriber unit otherwise generates an off hook condition, the central office generates a dial tone and supplies it to the calling subscriber unit to indicate the availability of phone service. After the calling subscriber has dialed a phone number of the remote (i.e. answering) subscriber unit, the SLIC passes a ring back sound directed to the calling subscriber to indicate that the network is taking action to signal the remote subscriber, i.e. that the remote subscriber is being rung. Alternatively, if the network determines that the remote subscriber unit is engaged in another call (or is already off-hook), the network generates a busy tone directed to the calling subscriber unit.

The SLIC also acts to identify the status to, or interpret signals generated by, the analog subscriber unit. For example, the SLIC provides −48 volts on the ring line, and 0 volts on the tip line, to the subscriber unit. The analog subscriber unit provides an open circuit when in the on-hook state. In a loop start circuit, the analog subscriber unit goes off-hook by closing, or looping the tip and ring to form a complete electrical circuit. This off-hook condition is detected by the SLIC (whereupon a dial tone is provided to the subscriber). Most residential circuits are configured as loop start circuits.

Connectivity is provided by a standard 10/100/1000 Mbps Ethernet interface 96 and Ethernet LAN ports 98, USB interface 104 and USB ports 106 or with additional chip sets, such as wireless 802.11a/b/g via WLAN interface 122 coupled to antenna 120. In addition, a GPIO interface 100 provides an interface for LEDs 102, etc. The network connectivity functions may also include a router or Ethernet switch core. Note that the DOCSIS MAC 82 and PHY 78 may be integrated into the cable modem processor 80 (FIG. 4) or may be implemented separately as shown in FIG. 2 wherein the DOCSIS PHY circuit 78 is shown implemented separately from the processor 80. In addition, the processor or other entity is operative to implement the transmission optimization mechanism of the present invention (block 118).

In the example embodiment presented herein, the tuner 76 is coupled to the CATV signal from the CMTS via port 72 and is operative to convert the RF signal received over the RF cable to an IF frequency in accordance with the tune command signal received from the processor.

The cable modem 70 comprises a processor 80 which may comprise a digital signal processor (DSP), central processing unit (CPU), microcontroller, microprocessor, microcomputer, ASIC, FPGA core or any other suitable processing means. The cable modem also comprises static read only memory (ROM) 86, dynamic main memory 84 and flash memory 88 all in communication with the processor via a bus (not shown).

The magnetic or semiconductor based storage device 84 (i.e. RAM) is used for storing application programs and data. The cable modem comprises computer readable storage medium that may include any suitable memory means, including but not limited to, magnetic storage, optical storage, semiconductor volatile or non-volatile memory, biological memory devices, or any other memory storage device.

In one example embodiment, any software required to implement the transmission optimization mechanism of the present invention is adapted to reside on a computer readable medium, such as a magnetic disk within a disk drive unit. Alternatively, the computer readable medium may comprise a floppy disk, removable hard disk, flash memory, EEROM based memory, bubble memory storage, ROM storage, distribution media, intermediate storage media, execution memory of a computer, and any other medium or device capable of storing for later reading by a computer a computer program implementing the system and methods of this invention. The software adapted to implement the transmission optimization mechanism of the present invention may also reside, in whole or in part, in the static or dynamic main memories or in firmware within the processor of the computer system (i.e. within microcontroller, microprocessor or microcomputer internal memory).

Figure 3:
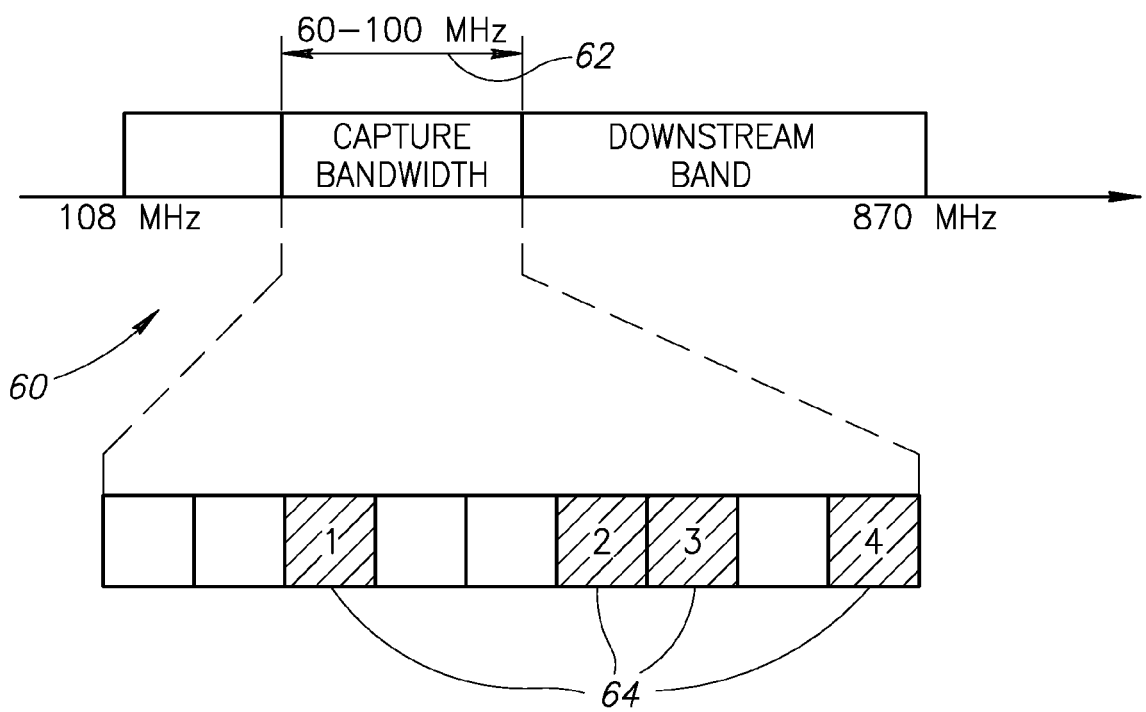
FIG. 3 is a diagram illustrating the capture bandwidth of the downstream band received from the CMTS.

A diagram illustrating the capture bandwidth (CBW) of the downstream band received from the CMTS is shown in FIG. 3. In accordance with the DOCSIS 3.0 specification, used here for illustration purposes only, the downstream (DS) frequency band range, generally referenced 60, extends from 108 MHz to 870 MHz. The capture bandwidth 62 (defined as the sum of the tuning bands in the tuning band (TB) list) is between 60 and 100 MHz in width and may lie anywhere in the DS band. The TB is defines a single continuous frequency interval, in MHz, located anywhere in the downstream band (108 MHz to 870 MHz). The tuning band list (TB List) is defined as a list of one or more Tuning Bands supported by the cable modem that defines the cable modem tuning capabilities.

Within the capture bandwidth, are N (e.g., four in this example) DS channels 64 that can be located anywhere in the capture bandwidth. An example arrangement of the N DS channels is shown in FIG. 3 where the NDS channels are indicated by the crosshatched channels 64.

Figure 4:
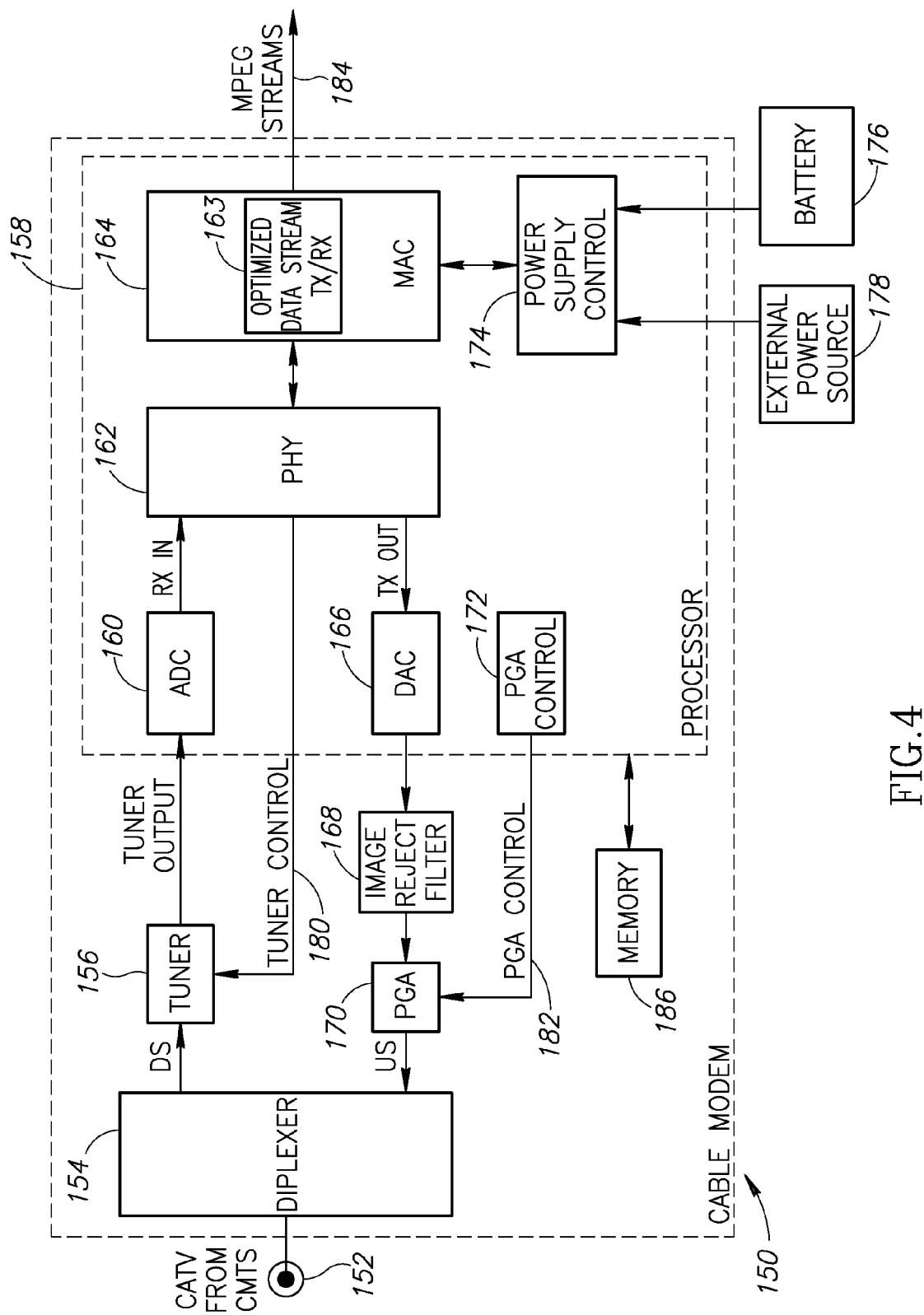
FIG. 4 is a simplified block diagram illustrating the processor of the cable modem of FIG. 2 constructed to implement the transmission optimization mechanism in accordance with the present invention.

A simplified block diagram illustrating the processor of the cable modem of FIG. 2 constructed to implement the transmission optimization mechanism in accordance with the present invention is shown in FIG. 4. The example cable modem, generally referenced 150, comprises diplexer 154 coupled to a CATV input 152, tuner circuit 156, processor 158, image reject filter 168 and PGA 170. The processor 158 is coupled to memory block 186 and comprises an analog to digital converter (ADC) 160, PHY circuit 162, digital to analog converter (DAC) 166, PGA control circuit 172, power supply control 74 and MAC 164. Power is supplied by an external power source 178 e.g., utility power, etc. or a battery 176.

In operation, in the downstream (i.e. receive) direction, the receive signal from the diplexer is input to the tuner circuit 156. The tuner output signals are input to the one or more ADCs to provide one or more RX I and Q input signals to the PHY circuit. The PHY circuit provides a tuner control signal 180 that controls the tuning of the tuner sub-circuits within the tuner. After MAC processing, one or more MPEG video streams 184 are output of the cable modem.

In the upstream (US) (i.e. transmit) direction, a digital TX output signal provided by the PHY circuit is converted to analog by the DAC. The analog signal is then filtered via the image reject filter before being amplified by the PGA whose gain is controlled by a PGA control signal 182 generated by the PGA control circuit 172.

In accordance with an embodiment of the invention, the MAC 164 in the cable modem comprises an optimized data stream transmit/receive block 163 which functions to improve the data unit transmit and/or receive process over a plurality of physical channels using the transmission optimization mechanism of the present invention, described in more detail infra.

Non-Optimized Data Transmission Mechanism

Figure 5:
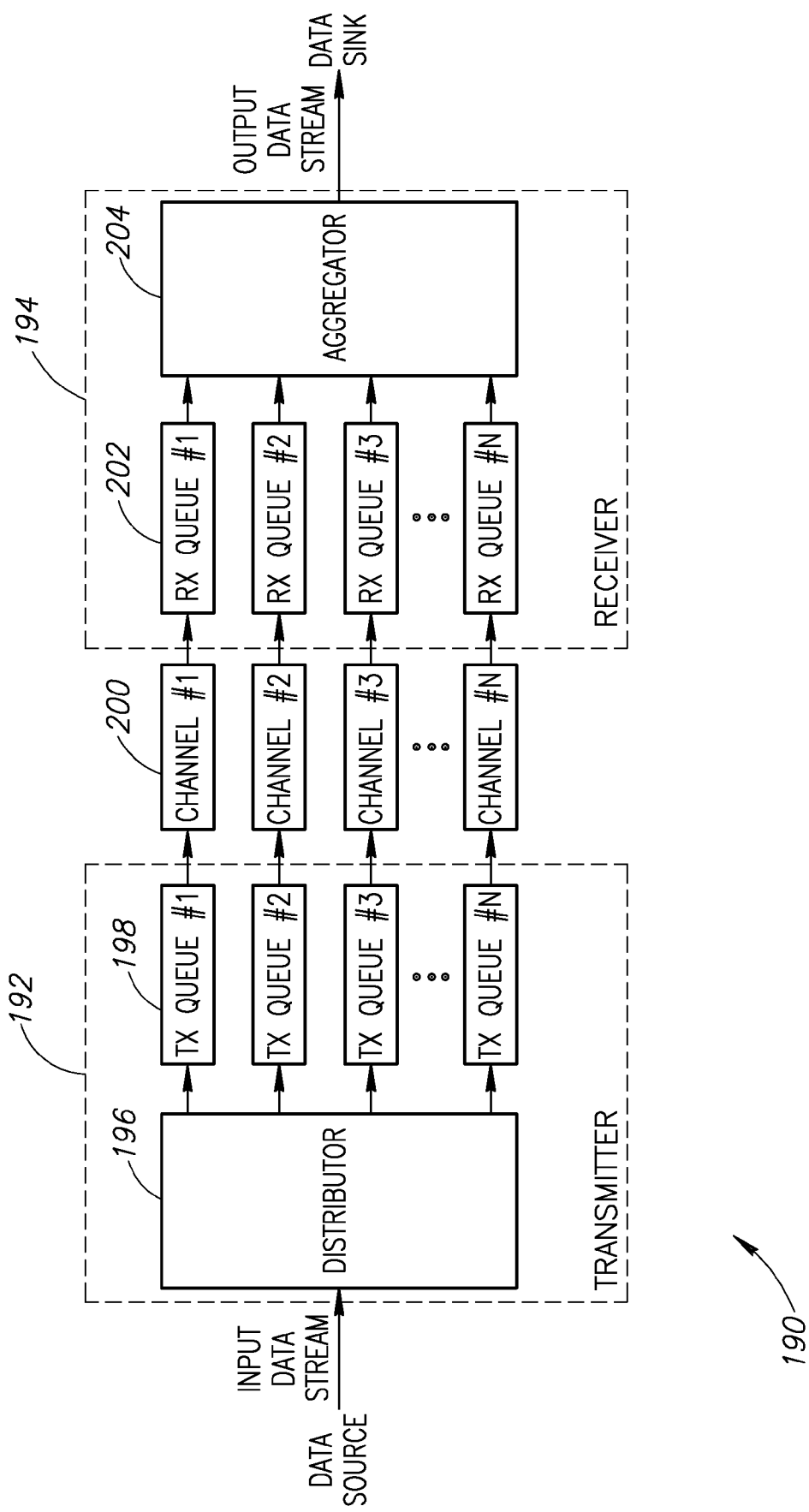
FIG. 5 is a block diagram illustrating an example embodiment constructed in accordance with the mechanism of data transmission over a channel group of the present invention.
Figure 6:
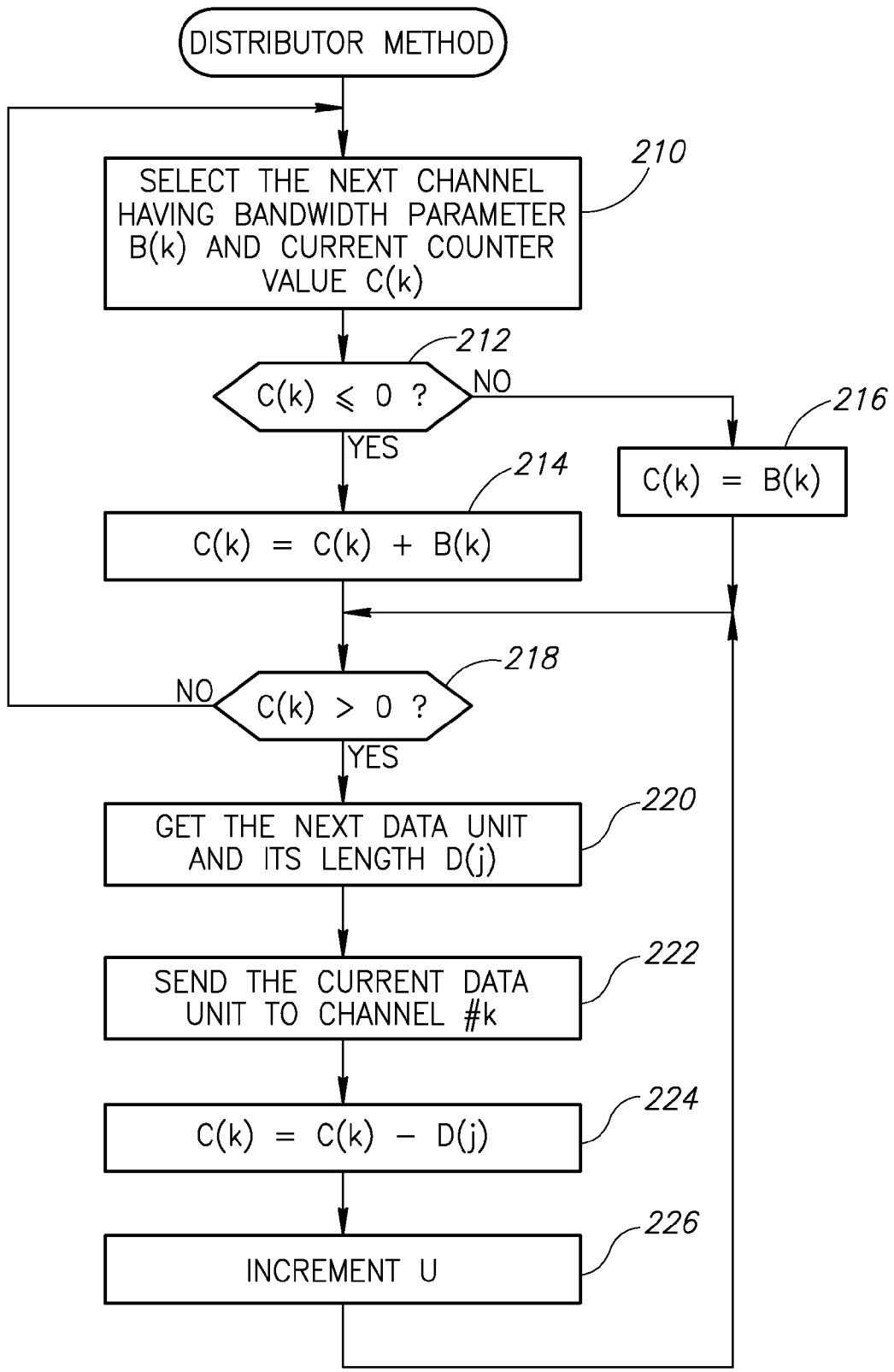
FIG. 6 is a flow diagram illustrating the distributor method of the present invention in more detail.

A block diagram illustrating an example embodiment constructed in accordance with the mechanism of data transmission over a channel group of the present invention is shown in FIG. 5. For illustration purposes only, the transmitter, as shown, is adapted to distribute data units from the data source over N physical channels.

The example communications system, generally referenced 190, comprises a data source, transmitter 192, a plurality of N physical channels 200, a receiver 194 and a data sink. The transmitter 192 comprises a distributor module 196 adapted to receive the input data stream from the data source and a plurality of N transmit queues 198 coupled to the distributor and to the channels 200. The receiver 194 comprises a plurality of N receive queues 202 coupled to an aggregator 204. The aggregator generates the output data stream to the data sink.

In accordance with the invention, the distribution block 196 on the transmitter side is operative to decide over which channel to transmit each input data unit. Similarly, the aggregation block 204 on the receive side functions to collect and restore the order of the data units to generate a single output data stream. A key feature of the invention is that the distributor and the aggregator must implement the same data unit distribution algorithm and associated parameters. The algorithm performed by the distributor is operative to generate a sequence of action that can be completely and permanently reproduced on the receive side.

Example algorithms suitable for use in the distributor and aggregator modules of the transmitter and receiver, respectively, will now be presented.

The definitions provided in Table 1 below apply throughout this document.

and starting/restarting data reception from some point in time during the transmission with non-zero counter values, as described in more detail infra. The invention also provides the capability of a communication device, e.g., cable modem, to join the data receiving session with the delay from its start.

Note that before multi-channel data transmission between both channel ends can occur, both channel ends should have knowledge of several constant parameters including: channel loop specification, T and B(k). The variable parameters U, L, C(k) are synchronized between the ends during the cable modem ranging process for the case of a DOCSIS system.

The distributor and the aggregator are operative to poll the channels in the channel group using the same cyclic channels order. For each data unit, each side only needs to decide whether to use the current channel or to switch to the next channel in the channel cyclic pool. For the transmitter, the distributor only needs to decide whether to transmit a data unit using the current channel or to switch to the next channel

TABLE 1

Definitions

| Term | Definition |
|---|---|
| Session | A sequence of data units in the data stream destined to the same user address which are required to be transmitted in the same original order as they were received in the input data stream. Note, however, that it is not necessary to keep the transmission order for data units that belong to different sessions. |
| Data Block | A set of data units in the input data stream queue. The input data stream is divided into sequences of data blocks during the transmission process. Each data block is an object for transmission plan building (described infra). Data blocks can contain only whole data units. The length of a data block can vary according to the free resources of the physical channel for the next data transmission loop/loops etc. |
| Data Unit | A minimal data item for transmission management having constant or variable length. |
| D(j) | The length of a received data unit. |
| U | Data unit cyclic counter: After receiver initialization, the counter is maintained separately on both channel ends. The counter is used in the event a problem occurs to inform the TX side of the data unit associated with the problem. |
| Channel loop | A configurable cyclic list of all channels in the group; one of the channels in the loop is defined as the first. This specifies the channel from which the channel management cycle begins. |
| T | The period for the distributor to repeat activities over all channels in the group. After selecting channel k the distributor fills the data queue for this channel with the data units from the incoming data stream at least for transmission during the nearest period T. Then, the distributor selects the next channel in the channel loop. T should be a common parameter for the channel group and is about the time of typical data unit transfer using one channel, e.g., 100-500 microseconds. |
| L | Distributor cyclic loop counter: This counter is incremented every time the distributor returns to transmit over the first channel after transmitting over the last channel in the loop. |
| L(k) | Aggregator cyclic loop counter for channel k. The current counters L(k) can be different for different channels on the receive side. |
| B(k) | The number of bytes that can be transmitted over channel k during the time T. B(k) values can be calculated on both sides on the basis of channel k downstream parameters or passed periodically by the transmitting side in periodic management messages, e.g., by the CMTS in MAC messages. Note that the bytes units may alternatively be replaced by bits, symbols, etc. and is not limited to bytes. Further, optionally, the channels in the polling group may be ordered from the channel with the largest B(k) to those with the lowest or vice versa. It is important to emphasize that it is not required that the value of B(k) be an integer, as it may contain fractional parts. As a result, there is no restriction in having a ratio of channel bandwidths represented by simple fractions like 3/5, etc. |
| C(k) | A signed "credit" byte counter for channel k, which may have non-integer values. |

It is assumed that the counters U, L and C(k) for all channels are reset to zero at the beginning of the session on both transmit and receive sides. Note that the invention provides the capability of initializing the counters to non-zero values in the channel cyclic pool. Similarly, for the receiver, the aggregator only needs to decide whether to receive a data unit using the current channel or to switch to the next channel in the channel cyclic pool.

A flow diagram illustrating the distributor method of the present invention in more detail is shown in FIG. 2. The distributor method is adapted to be performed by the distributor 196 (FIG. 5) and is adapted to loop over all channels in the channel group and to perform actions for the current channel. First, the next channel is selected, wherein the channel has associated with it a bandwidth parameter B(k) and a current counter value C(k) (step 210). In addition, counter L is incremented if the channel selected is the first channel in the channel pool. It is then checked if the counter value is less than or equal to zero (step 212). If it is, then channel k has work from the previous loop through the channels and the new 'credit' is added to the current counter value (step 214). If the counter value is greater than zero then it means that channel k was not fully busy in the past period (no input packets) and the current counter value is set equal to the bandwidth parameter (step 216). Note that such "pauses" of data do not happen in case of MPEGs (DOCSIS) which are continuously transmitted.

While C(k) is greater than zero (step 218), the next data unit and its length D(j) is obtained (step 220), the current data unit is transmitted over channel k (step 222), the data unit length D(j) is subtracted from C(k) (step 224) and the data unit cyclic counter U is incremented (step 226). Once the counter value C(k) falls to zero or less, the distributor switches to the next channel and the method continues with step 210.

A pseudo code listing of the method performed by the distributor is presented below in Listing 1.

---

Listing 1: Distributor method

---

1. Loop over all channels in the group: perform actions 2 -4 for the current channel.
/* The following actions are performed after switching to channel k with
   bandwidth parameter B(k) and current Counter value C(k) */
2. if (channel selected is the first channel in the loop) L++;
/* add transmission resource "credit" to the channel in accordance with its
rate */
if (C(k) <= 0)
/* channel #k has work from the past loop over channels */
    C(k) = C(k) + B(k);
else /* k was not fully busy in the past period (no input packets); such
    "pauses" of data do not happen in case of MPEGs which are sent
    permanently */
    C(k) = B(k);
3. while (C(k) > 0) { /* acting in the internal loop */
/* continue channel usage */
    get the next data unit and its length D(j)
    send the current data unit for handling to channel #k>;
    C(k) = C(k) - D(j);
    U++;
}
4. Switch to the next channel and go to 2 (external loop).

---

Figure 7:
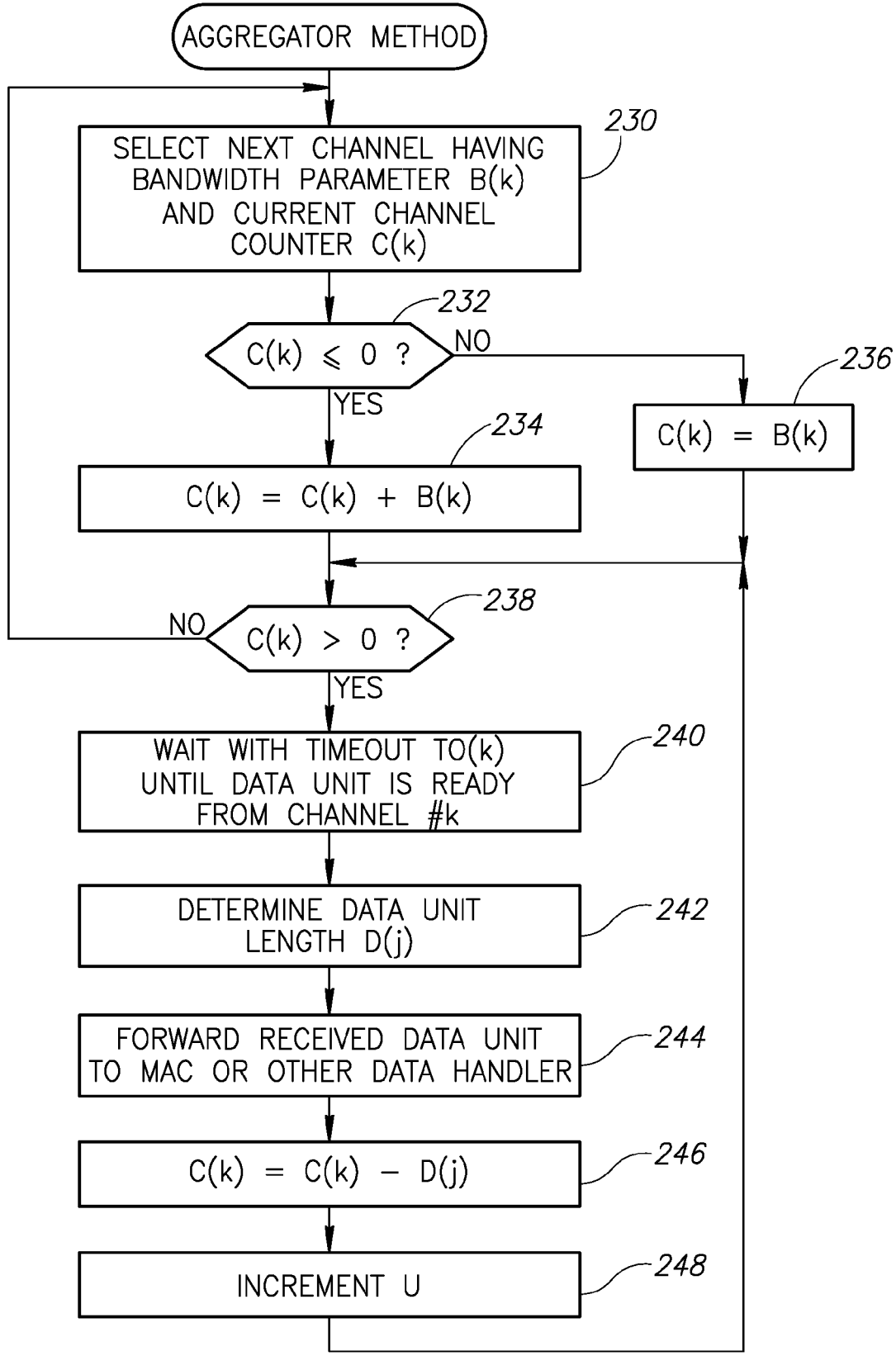
FIG. 7 is a flow diagram illustrating the aggregator method of the present invention in more detail.

The aggregator method performed by the aggregator module 204 (FIG. 5) is similar to the distributor method described hereinabove. A flow diagram illustrating the aggregator method of the present invention in more detail is shown in FIG. 7. First, the next channel is selected, wherein the channel has associated with it a bandwidth parameter B(k) and a current counter value C(k) (step 230). It is then checked if the counter value is less than or equal to zero (step 232). If it is, then channel k has work from the previous loop through the channels and the new 'credit' is added to the current counter value (step 234). If the counter value is greater than zero then it means that channel k was not fully busy in the past period (no input packets) and the current counter value is set equal to the bandwidth parameter (step 236). Note that such "pauses" of data do not happen in case of MPEGs (DOCSIS) which are continuously transmitted.

While C(k) is greater than zero (step 238), the receiver waits with timeout TO(k) until a data unit is ready from channel k (step 240), the length D(j) of the received data unit is determined (step 242), the received data unit is forwarded to the MAC or other data handler (step 244), the data unit length D(j) is subtracted from C(k) (step 246) and the data unit cyclic counter U is incremented (step 248). Once the counter value C(k) falls to zero or less, the aggregator switches to the next channel and the method continues with step 230.

A pseudo code listing of the method performed by the aggregator is presented below in Listing 2.

---

Listing 2: Aggregator method

---

1. Loop over all channels in the group: perform actions 2 -4 for the current channel.
/* The following actions are performed after switching to channel k with
   bandwidth parameter B(k) and current Counter value C(k) the
   following actions are done:*/
2. /* add transmission resource "credit" to the channel in accordance with
its rate */
if (C(k) <= 0)
    C(k) = C(k) + B(k);
else
    C(k) = B(k);
3. while (C(k) > 0) { /* acting in the internal loop */
/* continue channel usage */
    wait with timeout TO(k) until data unit is ready from channel k
        and get the next data unit and its length D(j);
    forward the received data unit to the MAC;
    C(k) = C(k) - D(j);
    U++;
}
4. Switch to the next channel and go to 2 (external loop).

---

A key aspect of the invention is that similar algorithms are implemented in the transmitter and the receiver in order that the receiver is able to determine how many data units to expect on any channel and to determine when to switch to the next channel. This knowledge eliminates the need for the transmitter and receiver to modify, remove or add any fields to the data units, such as sequence numbers. Such modifications or additions to the fields would normally be required for the receiver to know how to reassemble the original data stream from the individual data units received over the channels.

To aid in understanding the principles of the present invention, an illustrative example of the operation of the data transmission scheme will now be presented. Consider a particular system (may or may not be DOCSIS specific) with three channels (i.e. channel #1 through #3) that are aggregated to multi-channel. Let us assume that the channel capacities are: 9 Mbyte/sec for channel #1, 1 Mbyte/sec for channel #2 and 2.5 Mbyte/sec for channel #3. If the distributor period T=50 microseconds then B(1)=450 (bytes in period T), B(2)=50 and B(3)=125. We suppose for simplicity that each data unit contains 100 bytes (keeping in mind that variable length data units can be processed in the same way).

A discussion of the operation on the transmission side is followed by a discussion of the operation on the receive side. When the transmission session starts, round 1, step 1. With reference to Listing 1 above, channel #1 gets a resource of C(1)=450 bytes; the distributor performed step 3 of Listing 1 five times. As a result, five data units, data units #1 to #5, are passed for transmission to the TX queue associated with channel #1. Upon each data unit passed to channel #1, C(k) is decremented by 100 bytes and after the loop, C(1)=−50. This means that for the nearest period T channel #1 has 450 bytes to transmit (full capacity usage) and also has 50 additional bytes for the next period. C(1) is now negative, therefore the distributor turns its attention to channel #2.

Round 1, step 2: In a similar way channel #2 gets C(2)=50. After one data unit passing to channel #2 (data unit #6), the counter C(2)=−50 and the distributor therefore turns to channel #3. Round 1, step 3: Channel #3 gets C(3)=125. So, channel #3 gets two data units (data units #7, #8) for transmission and remains with C(3)=−75.

Note that round 2 can begin 50 microseconds later than round 1 because all channels have data for transmission at least for the period T. Round 2, step 1: C(1)=−50+450=400. Therefore channel #1 gets four new data units: data units #9 to #12. Round 2, step 2: C(2)=−50+50=0. This means that channel #2 is loaded for the next period as well and does not get data units during this round. Round 2, step 3: C(3)=−75+125=50. Therefore, the channel gets data unit #13 for transmission. In 50 microseconds, the distributor enters round 3.

Regarding the receiving side and with reference to Listing 2 above, when the receiving session starts, the receiver has information about T, B(k) and current values of C(k). Round 1, step 1: Channel #1 gets a resource 'credit' of C(1)=450 bytes; then the aggregator waits in a loop for five data units (data unit #1 to data unit #5) from channel #1 (action 3 of the algorithm). Upon each data unit received from channel #1, C(1) is decremented by 100 bytes and after the loop processing, C(1)=−50. This means that all data units that channel #1 received for transmission during round 1 were received already. Therefore the aggregator switches to channel #2. Note that in the case of variable length data units, the method is operative to decrement the length of the received message at each loop iteration.

Round 1, step 2: In similar fashion channel #2 gets C(2)=50. The aggregator waits for one data unit to be received from channel #2 (data unit #6), counter C(2)=−50 and therefore the aggregator switches to channel #3. Round 1, step 3: Channel #3 gets C(3)=125. Therefore, the aggregator has to receive two units from channel #3 (data units #7, #8) for transmission and ends up with C(3)=−75.

Round 2, step 1: C(1)=−50+450=400. Therefore, channel #1 gets new four units: data units #9 to #12 for channel #2. Round 2, step 2: C(2)=−50+50=0. This means that channel #2 is loaded for the current period also, i.e. has no new data units related to the second transmission cycle. The aggregator does not wait for data units from channel #2 during this round. Round 2, step 3: C(3)=−75+125=50. Therefore, the aggregator should receive data unit #13 from channel #3, etc.

It is noted that as we see from the particular example presented hereinabove, during time T of the first receiving round (referred to as T1) the aggregator receives data unit #1 to #5 from channel #1. After this, the aggregator waits an additional period T for data unit #6 (period T2) from the channel #2 (because its transmission takes 2*T). The aggregator must wait for the arrival of data unit #6 and cannot handle data units #7, #8 that already arrived at the receiver on channel #3 as well as data units #9 to #12 on channel #1 receiver from the second TX round. This is a typical situation for the case when maximal channel capacity in the group is several times higher than the minimal channel capacity in the group. As a rule, such situations require bigger buffers for the accumulation of data units. A technique to avoid such situations from occurring is presented infra.

The timeout expiration method of the present invention will now be described in more detail. Regarding the aggregator 204 (FIG. 5), it is preferable that the timeout period TO(k) should exceed the time required for maximal data unit transmission by channel k. Note that a timeout expiration can occur in cases of (1) a traffic hit, (2) equipment failure (transmitter/channel/receiver), which may have other indications as well, and (3) a silent period: if the protocol accepts silence in the channel and there is nothing to transmit.

Figure 8:
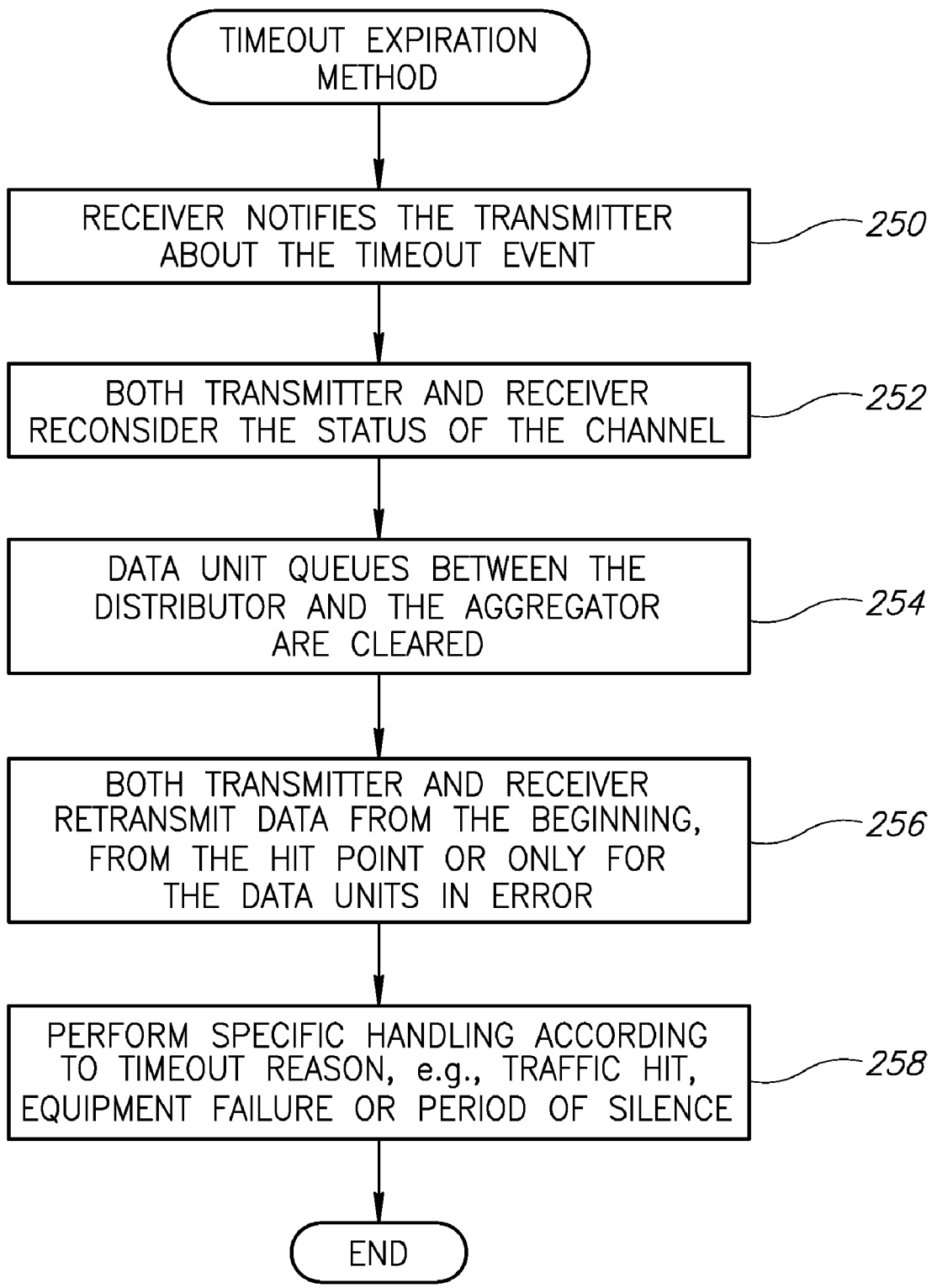
FIG. 8 is a flow diagram illustrating the timeout expiration method of the present invention in more detail.

A flow diagram illustrating the timeout expiration method of the present invention in more detail is shown in FIG. 8. Typically, a timeout expiration requires special handling that is system dependent (protocol+type-of-service+equipment+software, etc.). The minimum that is preferably done in the event of a timeout expiration comprises (1) the receiver informing the transmitter about the event (step 250); (2) both sides having to reconsider the channel status (step 252), and optionally clearing the data unit queues between the distributor and aggregator (step 254); and (3) if required, both sides provide data retransmission either from the beginning, from the hit point or only for the data units in error (step 256). For this purpose a data units cyclic counter U may be useful. This counter is synchronized between the transmitter and receiver together with L and C(k). Therefore, the problem report message should contain parameters (k, L, U, C(k)).

In addition to the above, each timeout expiration event typically requires specific handling, such as for a traffic hit, equipment failure or period of silence (step 258). In the event of a traffic hit, and in the case of variable length data units and an uncorrectable error in data unit(s), the channel ends are resynchronized before further data transmission occurs. The problem here being that for the erred data unit(s) the number of error units and their D(j) parameters are unknown for the receive side and the receiver cannot correctly update the parameters U, L(k) and C(k). In the case of constant length data units and a single erred data unit there are good chances to continue data transfer with further erred data unit retransmission. Note that it is also possible to claim channel failure if there are too many traffic hits (as per a standard statistical criteria).

In the event of equipment failure, a resynchronization is required after channel blocking in the group. In the DOCSIS specific case, the downstream channels from the cable modem termination system (CMTS) to a given cable modem (CM) typically fall together. For channels based on separate links, a procedure for single channel removal from the group can be considered.

In the event of a silent period, the best workaround is to transmit dummy data units during silence intervals.

Figure 9:
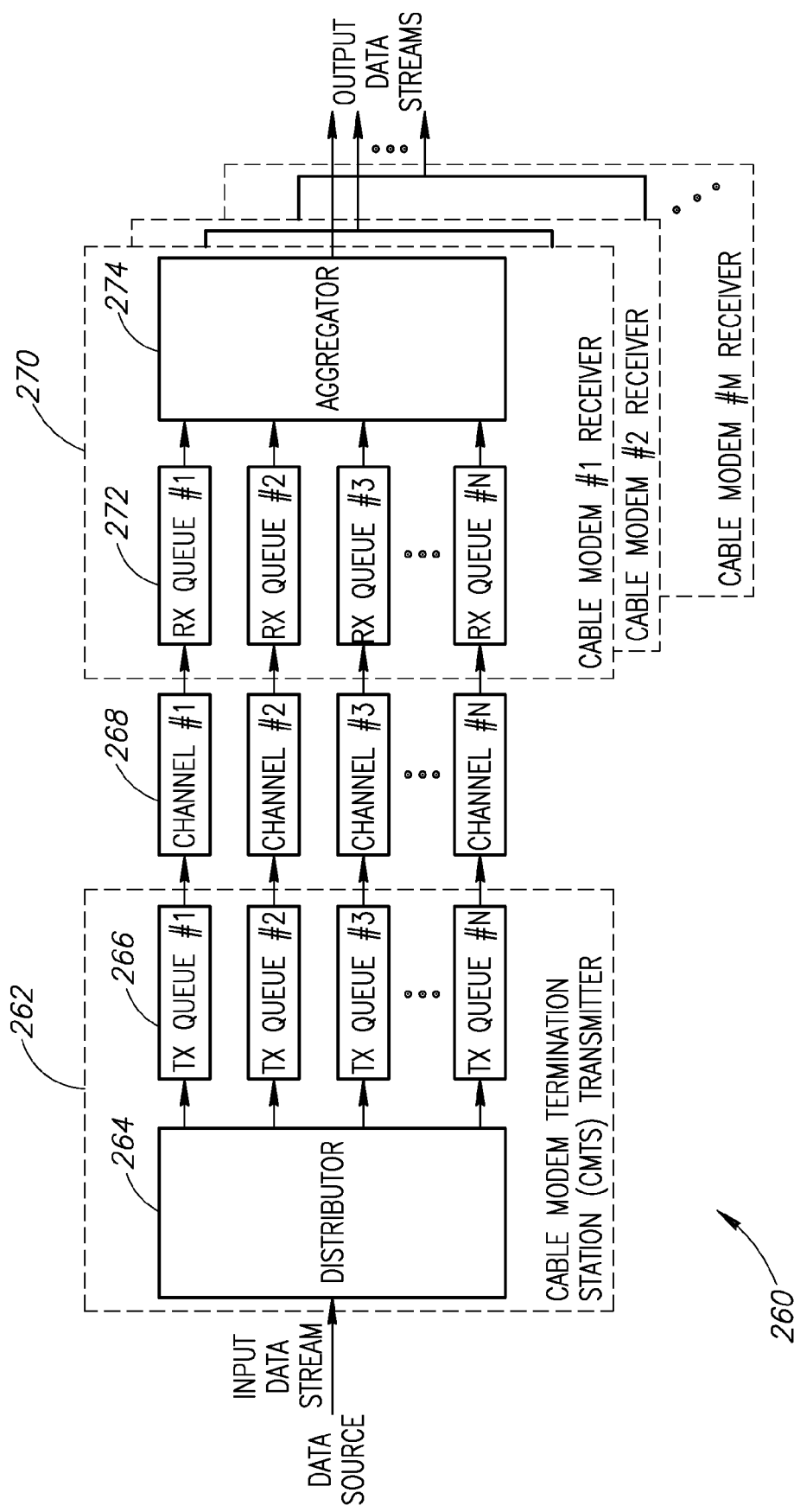
FIG. 9 is a block diagram illustrating an example embodiment constructed in accordance with the mechanism of data transmission over a channel group of the present invention and adapted to operate in a DOCSIS communications system.

An example of the data transmission mechanism of the present invention as applied to a DOCSIS system will now be presented. A block diagram illustrating an example embodiment constructed in accordance with the mechanism of data transmission over a channel group of the present invention and adapted to operate in a DOCSIS communications system is shown in FIG. 9. The communication system, generally referenced 260, comprises a data source for providing an input data stream, transmitter 262, a plurality of N physical channels 268, a plurality of cable modem receivers 270 adapted to generate N output data streams. The transmitter 262 comprises a distributor module 264 adapted to receive the input data stream from the data source and a plurality of N transmit queues 266 coupled to the distributor and to the channels 268. The receivers 270 each comprises a plurality of N receive queues 272 coupled to an aggregator 274. Each aggregator generates the output data stream to its own data sink.

In accordance with the invention, the distribution block 264 on the transmitter side is operative to decide over which channel to transmit each input data unit. Similarly, the aggregation block 274 on the receive side functions to collect and restore the order of the data units to generate a single output data stream. A key feature of the invention is that the distributor and aggregators must implement the same data unit distribution algorithm and associated parameters. The algorithm performed by the distributor is operative to generate a sequence of action that can be completely and permanently reproduced on the receive side. In a DOCSIS system, the transmitter is inside a cable modem termination station (CMTS). On the other end of the link, a plurality of M receivers, each located in a different cable modem operate in parallel to generate M output data streams.

Figure 10:
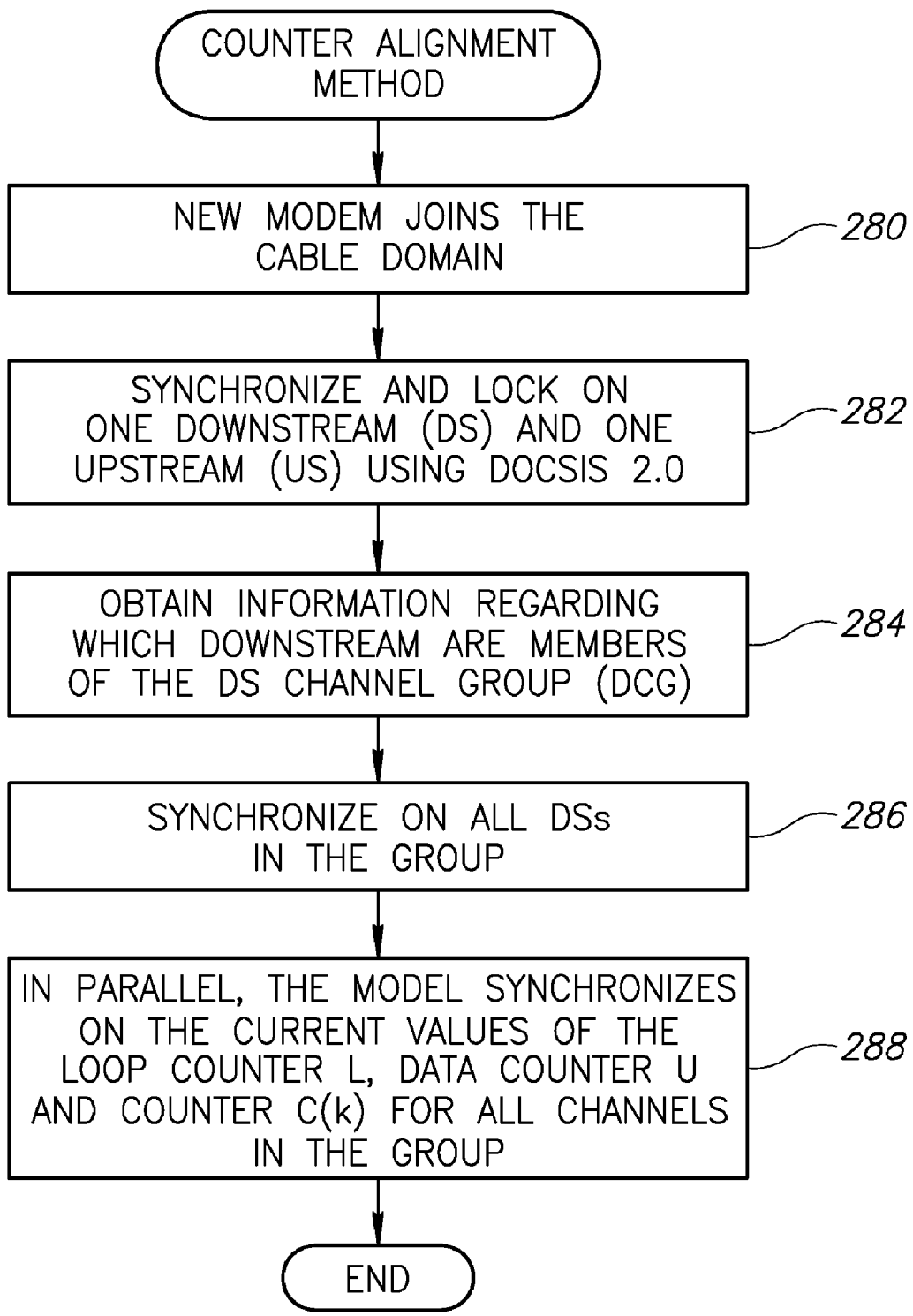
FIG. 10 is a flow diagram illustrating the counter alignment method of the present invention in more detail.

The counter alignment method of the present invention will now be described in more detail below. A flow diagram illustrating the counter alignment method of the present invention in more detail is shown in FIG. 10. In the descriptions of the distributor and aggregator methods hereinabove, it was assumed that the methods are correctly started (i.e. counters reset, etc.) on both channel sides (i.e. transmit and receive). In some cases, it is desirable to start the receiving process from some time point during the transmission from the current counter, i.e. values other than zero. For example, this may happen when the receiver attempts to resynchronize the transmission process after a traffic hit. Considering a DOCSIS system, this is applicable in the case where a cable modem joins an existing network. The following method describes how to initialize a new modem that joined the cable domain. Note that for illustration purposes, the method is described in the context of a DOCSIS system. It is appreciated, however, one skilled in the art can define a similar process for other protocols as well as an addition to an auto-negotiation protocol.

In a DOCSIS cable system, the new modem attempting to join the cable domain (step 280) should synchronize and lock on one downstream (DS) and one upstream (US) using DOCSIS 2.0 (step 282). Therefore, it selects a DS that supports DOCSIS 2.0. At this point, it obtains information including which DSs are members of the DS Channel Group (DCG) (step 284). In addition, the modem should then synchronize on all DSs in the group (step 286). In parallel, the modem should then synchronize on the current values of the loop counter L, data unit counter U and C(k) counter for all channels in the group (step 288). Note that the update of these counters should be periodically sent by the transmit side for each channel in the group separately. It should be used by the new modems joining the cable domain as well as by the existing modems to ensure that they are still synchronized with the distributor. For this purpose the MDD or DCD message can be extended by adding fields/TLVs for L(k), U and C(k) counters. The field/TLV should represent the L, U and C(k) values at the moment the data unit enters the TX queue of the particular channel k. Note that alternative to the SYNC message may be used. For example, alternatives to the SYNC message include (1) a new message type; (2) another message type extension (3) an MPEG solution—a special MPEG block indicating the counter for the given channel k transmitted by k, generated by the TX PHY k, and not forwarded to the MAC.

Getting the set (L, U, C(k)) for the current channel k, permits the aggregator to update these parameters (using the algorithm from the previous paragraph) upon the arrival of each data unit on this channel and to be fully synchronized with the distributor side in this aspect. From here on each data unit D(j) can obtain its relevant parameters (L, U, C(k)) that should be kept with the data unit for correct aggregation or error handling. In this case, there are some differences in the logic of the distributor and aggregator. For the distributor, L—is a common parameter for the channel group. For the aggregator, L(k) is the loop number for the currently received data units on channel k.

Now consider that $L_{max}$ is the largest loop number over all current L(k) values that the aggregator keeps when it begins multi-channel receiving, while also taking into account the possible wrap around of the cycle counter. This means that data units having $L_j <= L_{max}$ should be ignored because the receiving was started too late to provide full aggregation of this data. Only starting from data units with counters $L_j > L_{max}$ can be aggregated without loss of data units.

This mechanism enables a modem to start receiving multi-channel data whenever it requires to do so (scenarios of cable modem or CMTS implementation can be considered). Note that the modem can revert to uni-channel DS as well (it can be also initiated by the CM or CMTS). An additional mechanism of obtaining instructions/permissions from the CMTS for such switches is required. The DCC command can be one of the possible ways to initiate a switch of this kind.

It is important to note that the data transmission scheme of the present invention is not limited for use with any specific protocol. It is appreciated that one skilled in the art can apply the data transmission of the present invention to numerous other protocols and layers without departing from the scope of the invention. For example, the scheme can be used at layer 1 of the OSI model stack as well at higher layers.

Note also that some specific data units may require transmission by a particular channel or subset of channels within the channel group. This enables the scheme to operate in certain environments comprising legacy systems. Note also that the data transmission scheme may be used for either point-to-point or point-to-multipoint data transmission.

The scheme can also be modified to support setting priority on individual data unit transmission. As applied to a DOCSIS system, the scheme can be used for data unit distribution at the packet level, at the MPEG level or the byte group level, in accordance with the DOCSIS 3.0 specification. Further, the features of the data transmission scheme allow compatibility not only with existing versions of cable modems but any future cable modem versions as well.

Some of the advantages of the data transmission scheme of the invention were described hereinabove. On the one hand, an advantage is that the method provides a general and more flexible approach to the data transmission problem. On the other hand, the implementation of this method is relatively simple and does not require much large additional hardware resources. In particular (1) the algorithm is flexible enough to allow arbitrary downstream profile relations between channels, R-S encoding parameters, etc; the algorithm loads the channels in accordance with their bandwidth; (2) the algorithm does not assume constant data unit length; therefore the methods of the invention can be implemented for packets or MPEG distribution; (3) the addition of new transmission profile does not require a hardware or software redesign; (4) the transmit profile parameters may be modified "on the fly"; and (5) the data unit length parameters in the description above can be measured in bytes, symbols, bits or any other suitable units.

Optimized Data Transmission Mechanism

The non-optimized transmission scheme described supra considered a situation wherein data units of one or several data streams are distributed between physical channels of a group. In practice, however, the situation can be different. In particular: (1) some data units may be intended for transmission by a particular channel in the group, such as for DOCSIS 1.x and DOCSIS 2.0 legacy modem support, or for some specific management messages like the SYNC message; and (2) some data units may be intended to be transferred by a subset of channels in the group (typically defined as another channel group).

The non-optimized transmission scheme uses a group of physical channels as one logical channel. The input data stream contains data units of several sessions where data units of each session can be assigned for transfer over any physical channel in the channel group. The optimized transmission scheme described infra improves data transmission effectiveness for the channel group under the conditions of: (1) different physical channel bandwidths in the group; (2) different data unit lengths; and (3) several data sessions multiplexed in the input data stream without any dominant session (requiring approximately 80% of the full data stream capacity).

The non-optimized transmission scheme has definite advantages on the one hand (as described supra) but also has several potential problematic implementation points on the other hand. In particular, if a long data unit is assigned to a slow physical channel in the channel group during the transmission process, than the transmission of this data unit may take several transmission loops.

The following modification of the example presented above in connection with Listings 1 and 2 emphasizes the undesirable effect. After changing the length of data unit #6 (assigned to the slowest channel in the group) from 100 bytes to 500 bytes, the situation becomes the following. In the same manner as above, the distributor assigns data units #1 to #5 to channel #1, data unit #6 to channel #2, etc. The transmission of data unit #6, however, will take 10 transmission loops. During this period all data units from data unit #7 on up transmitted on channels #1 and #3 should be buffered on the receiving side and their handling or forwarding should be suspended for 10 transmission loops.

Although the data transferring process remains consistent in principle, in practice: (1) enlarged buffers are required for the data queues of fast channels at the receiving side; otherwise the potential for dropping data units drop due to buffer overflows is increased; (2) delays in data transferring are created wherein the link delays are accumulated during the transmission process; and (3) delays also arise along a sequence of data links where some of the links use multi-channel transmission.

For example, due to these factors undesirable effects may occur.

Effect #1: The addition of a slow channel to a group of fast channels can cause a "bottleneck" effect which causes a decrease in the channel group capacity and increases the required data buffer length on the receiving side, etc.

Effect #2: Consider a device receiving a data stream from link A and forwarding the stream (or part thereof) to link B of the same bandwidth. Link A uses a channel group. Then each pause in data reception from link A (due to Effect #1 above) causes a pause in transmission to link B, thus decreasing the bandwidth usage of link B.

Note that these data transfer delays are especially undesirable for voice and video sessions, since these types of sessions are very sensitive to variations in data unit delivery delays. One way to avoid or decrease these "bottleneck" effects is to include in a channel group only channels with similar bandwidths where the ratio of the maximum channel bandwidth to the minimum channel bandwidth is within a specified range (e.g., less than 2).

The non-optimized transmission scheme considers the following two queues: (1) a data unit queue and (2) a channel resources queue for the current transmission loop. The scheme is operative to determine the scheduling of data units to physical channels at the transmitter and to reconstruct the original order of the data units at the receiving side. The scheme, however, does not consider the potential bottleneck effects described above.

To address this, the present invention provides an optimized transmission scheme which modifies the non-optimized scheme described supra by adding a transmission optimization block (or step) before the data distributor block for performing preliminary handling on the input data stream. The transmission optimization block functions to create a significantly improved optimized transmission plan for the nearest period of N>0 transmission loops. The possibility of building an improved transmission plan appears in situations in which multiple sessions are present in the data stream (which is usual in practice) and there is no dominant session that uses a major portion of the data stream bandwidth. The possibility is based on the fact that the transmission order of data units is essential for data units of the same session and is not essential for data units of different sessions. This allows some data units to be switched in the input queue in order to improve the transmission plan. The improved transmission plan scheme described here can be considered as a specific kind of optimization problem, the main aspects of which are described below.

Figure 11:
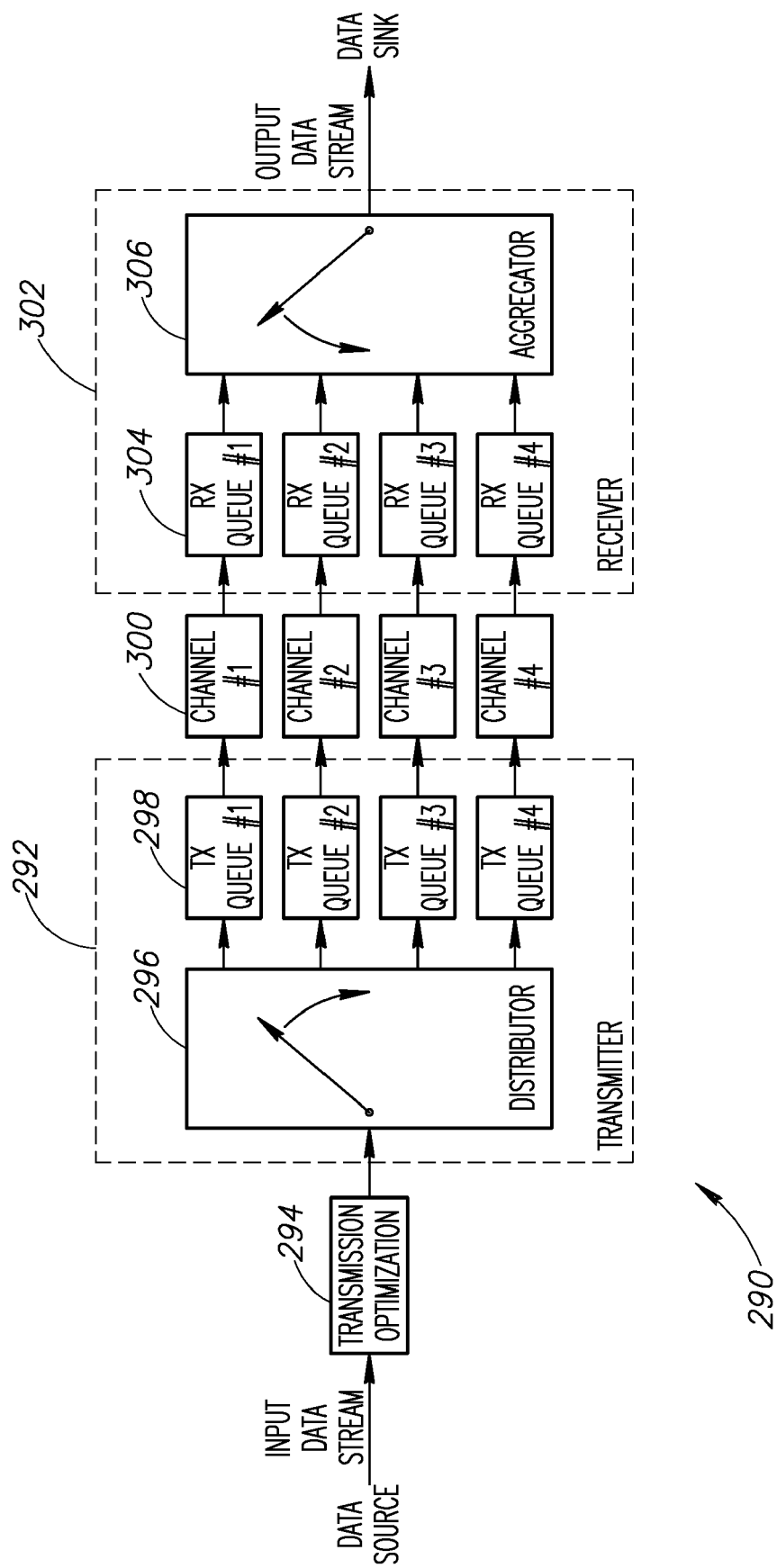
FIG. 11 is a block diagram illustrating an example embodiment constructed in accordance with the transmission optimization mechanism of the present invention.

A block diagram illustrating an example embodiment constructed in accordance with the transmission optimization mechanism of the present invention is shown in FIG. 11. For illustration purposes only, the transmitter, as shown, is adapted to distribute data units from the data source over a channel group comprising N physical channels, in accordance with DOCSIS 3.0 specification. It is appreciated that the invention may be used with a channel group comprising any desired number of physical channels.

The example communications system, generally referenced 290, comprises a data source, transmitter 292, a plurality of four physical channels 300, a receiver 294 and a data sink. The transmitter 292 comprises a transmission optimization block 294, distributor module 296 and a plurality of four transmit queues 298 coupled to the distributor and to the physical channels 300. The receiver 302 comprises a plurality of four receive queues 304 coupled to an aggregator 306. The aggregator generates the output data stream to the data sink.

In accordance with the invention, the transmission optimization block 294 is operative to receive the input data stream from the data source and to determine an optimized transmission plan. The distribution block 296 on the transmitter side is operative to place each data unit into the appropriate transmit queue in accordance with the optimized transmission plan. The aggregation block 306 on the receive side functions to collect and restore the order of the data units to generate a single output data stream. A key feature of the invention is that the distributor and the aggregator must implement the same data unit distribution algorithm and associated parameters. The algorithm performed by the distributor is operative to generate a sequence of actions that can be completely and permanently reproduced on the receive side.

The input information required for generating the improved transmission plan includes the following components: (1) the current state of the channel group including the physical channel bandwidths and channel capacity reserves for the next transmission loop; and (2) the current state of the input data stream, including unit length and unit session_id for each data unit in each data block considered.

Variables are used by the scheme to represent the data unit transmission plan, e.g., modifiable data unit sequential numbers for transmission. The previous non-optimized transmission scheme is improved using the following actions: (1) permitting changes in the order of transmission of two subsequent data units as long as the particular data units belong to different user sessions; and (2) permitting the transmission of "empty" or dummy data units of variable length, which in some situations can improve the link characteristics. Note that typically the transmitting side specifies the best length for empty data units in accordance with the particular implementation. Note also that the dummy data units must be recognized and dropped on the receiving side.

In addition, the transmission plan must comply with the following restrictions: (1) it must keep the original transmission order of the data units for each session in the data stream; and (2) all data units within a data block must be included in the transmission plan. Note that depending on the implementation, the transmission intervals for data units may overlap. In this case, the term "transmission order" refers to the order of transmission starts or the order of transmission ends where the transmission order is not exactly maintained in that one data unit can be transmitted on channel #k at the end of a transmission loop while the next data unit can be transmitted on channel #(k+1) at the beginning of the same transmission loop. In the context of this invention, transmission order means the order data units are scheduled for transmission (i.e. the sending of data units to channel queues). The scheme ensures that: (1) the order violations are sufficiently restricted in time so as to not materially affect performance; and (2) the receiving side can ensure re-sequencing whereby the original order of the data units can be reconstructed exactly for each session.

Figure 12:
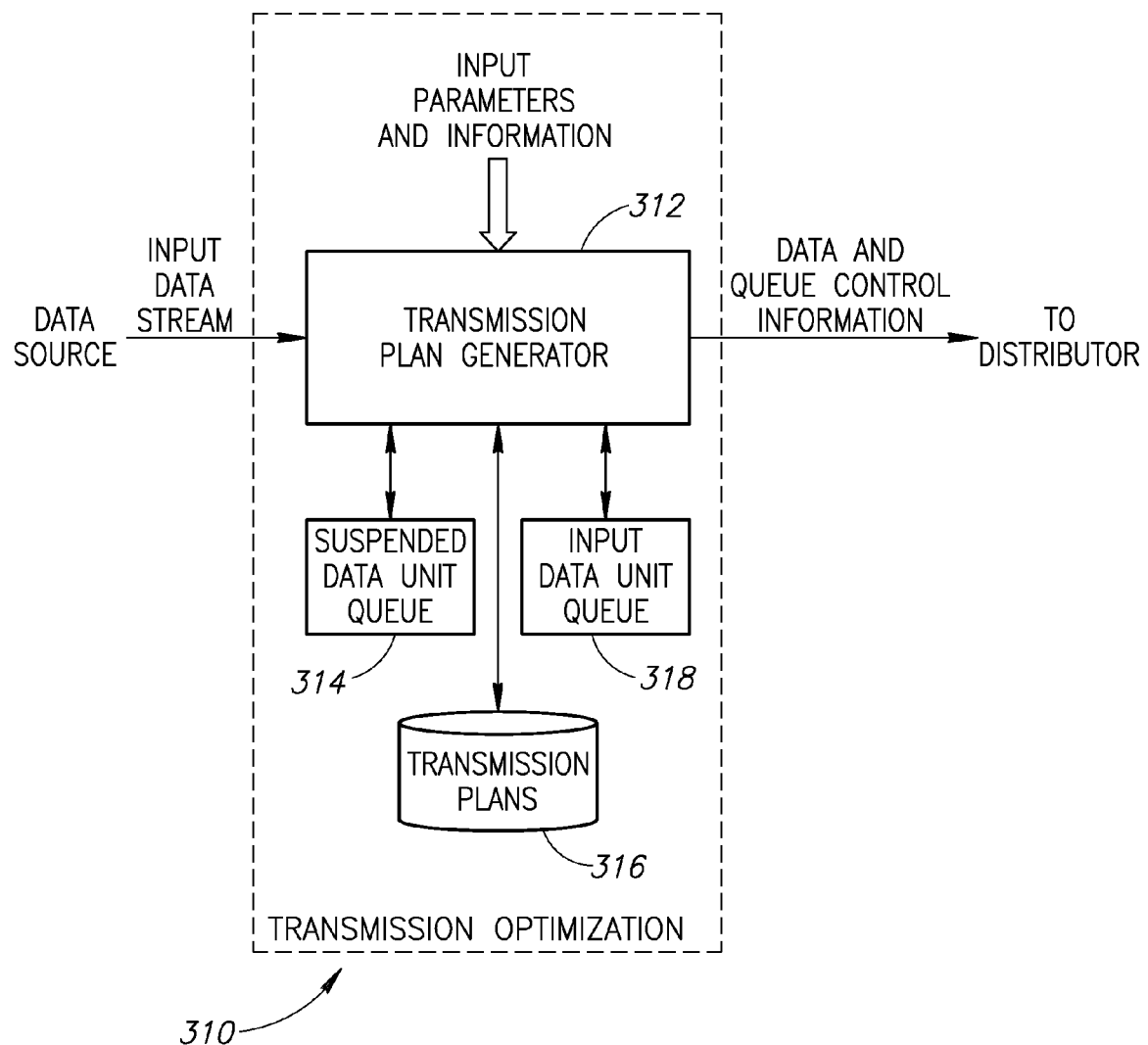
FIG. 12 is a block diagram illustrating the transmission optimization block of FIG. 11 in more detail.

A block diagram illustrating the transmission optimization block of FIG. 11 in more detail is shown in FIG. 12. The transmission optimization block, generally referenced 310, comprises a transmission plan generator 312, suspended data unit queue 312, input data nit queue 316 and storage 314 for transmission plans (e.g., database, memory or other suitable data structure). In operation, the transmission plan generator is operative to generate a plurality of transmission plans for input data blocks. Inputs to the transmission plan generator include the input data stream and a plurality of input parameters and information, e.g., current state of the channel group and input data stream, etc. The transmission plan generator is operative to output the data units to be transmitted and appropriate transmit queue control information. The queue control information is generated in accordance with the transmission plan selected to be used. It includes scheduling information used by the distributor which determines into which transmit queue each data unit is to be placed.

The transmission plan generator uses one or more optimization criteria which comprises some expression of the effective transmission requirement. To construct a global optimal transmission plan for the entire transmission process it is required to have in advance information about all data units to be transmitted for all sessions. Practically, however, such information is not available. Thus, the data stream is divided into data blocks and a transmission plan is generated for each data block.

In practice, however, although the sequence of transmission plans generated for data blocks is typically less effective than the hypothetical global optimal transmission plan for the entire transmission, it can be close enough to the optimal transmission plan depending on the implementation. It is noted that the mechanism of the invention does not require the generation of an optimal transmission plan for each data block. The mechanism creates an improved data block transmission plan compared to the plan built by the non-optimized data transmission mechanism. The optimized data transmission mechanism should be substantially close to the optimal block transmission plan for the given input information: i.e. data block descriptors and channel descriptors. The transmission plan improvement mechanism of the present invention requires additional calculations. Thus, it requires a compromise between the quality of the transmission plan and the complexity of the calculation(s).

One possible criteria for the generation of improved transmission plans is to minimize the time required for receiving data blocks at the receiving side of a link. If a transmission plan quality criterion $T_{rx}$ is used then it can be useful to calculate the following entities:

$T_b$ criterion value for the basic transmission plan created by the non-optimized mechanism;

$T_i$ the ideal time for data block transmission on the basis of data block length, channel bandwidths and channel resources for the next transmission loop; this calculation considers the data stream as a sequence of bytes without their division into data units, data sessions, etc.; $T_i$ determines how long will take to get that number of bytes on the receiving side.

Each improved transmission plan for this data block has criteria value $T_p$ such that $$T_i \leq T_p \leq T_b \qquad (1)$$

Note that the closer $T_p$ is to $T_i$, the better the transmission plan. Note also that $T_i$ represents the best time possible (i.e. ideal time). Although practically, this is not achieved, the goal is to schedule data units so as to get as close as possible to it. From amongst all transmission plans generated, each having an associated $T_p$, the plan with the best $T_p$ is selected. The value $T_p$ can be generated since the time to transmit a data unit to the other side is know as well as the ability to simulate the transmit and receive process using one or more models generated a priori.

Note also that initially, a basic transmission plan for each data block is generated using the non-optimized data transmission mechanism. In accordance with the invention, this transmission plan, however, is only one of several multiple possible transmission plans. This basic plan is accorded a criterion value of $T_b$. This basic plan, however, is likely to not be the best transmission plan.

Figure 13:
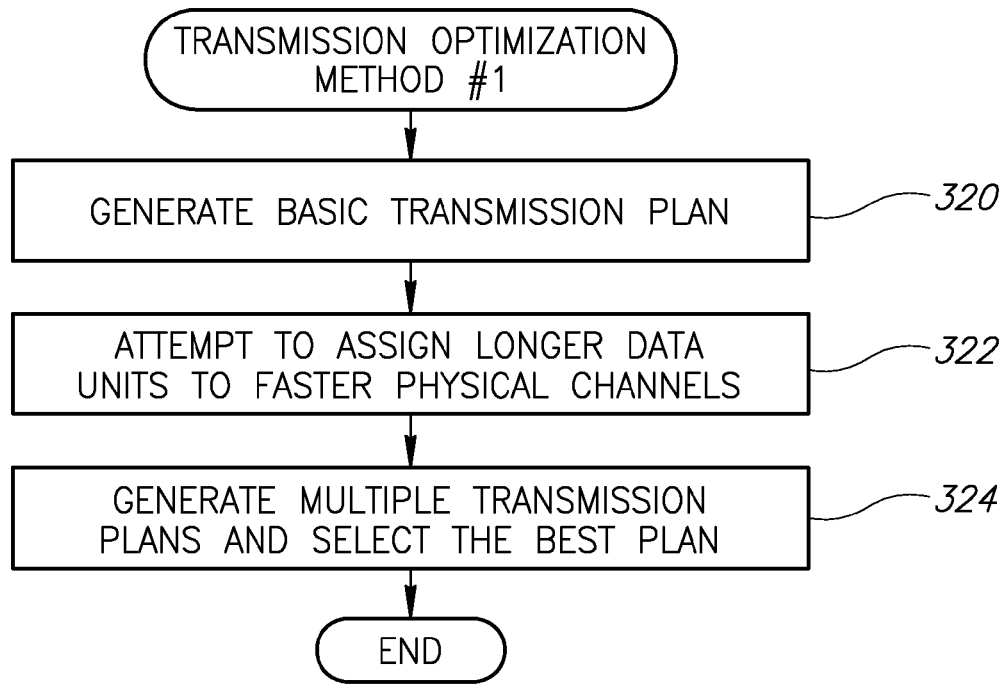
FIG. 13 is a flow diagram illustrating a first transmission optimization method of the present invention.

In accordance with the invention, several transmission optimization mechanisms will now be described. A flow diagram illustrating a first transmission optimization method of the present invention is shown in FIG. 13. In a first example transmission plan improvement mechanism method, the basic transmission plan is first generated using the non-optimized mechanism described supra (step 320). To improve upon this basic plan, the method attempts to assign longer data units to faster physical channels (step 322). Several transmission plans are generated using this method and the best plan from among them is selected (step 324).

Figure 14:
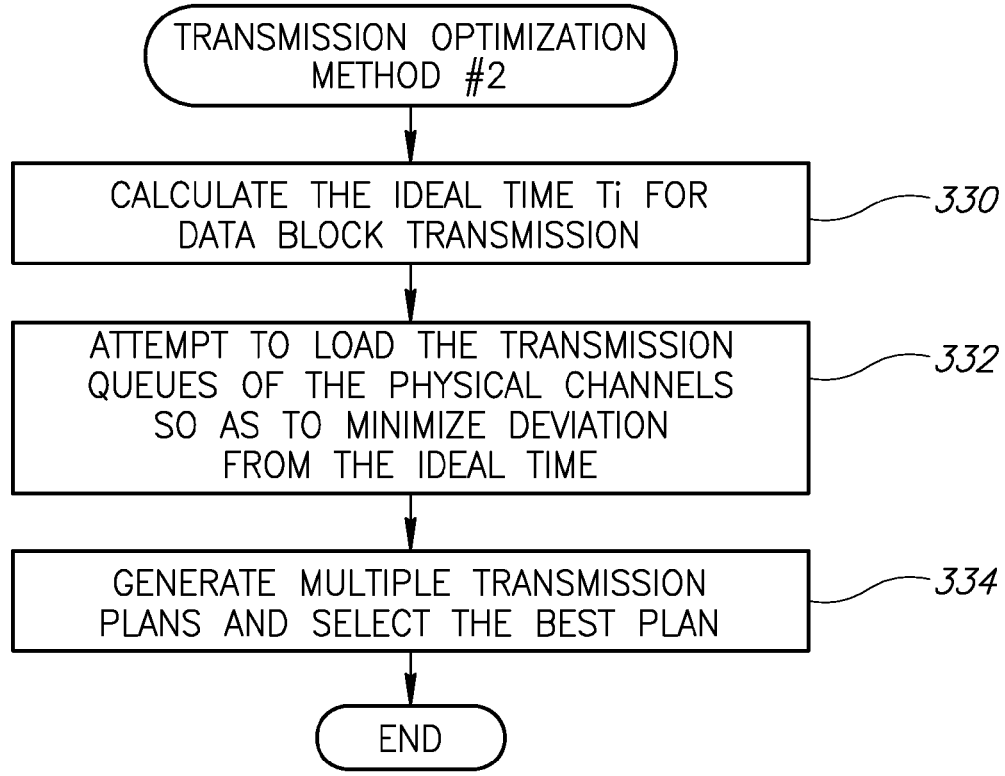
FIG. 14 is a flow diagram illustrating a second transmission optimization method of the present invention.

A flow diagram illustrating a second transmission optimization method of the present invention is shown in FIG. 14. In a second example transmission plan improvement method, the ideal time $T_i$ for transmission of the data units within a data block is calculated (step 330). Then, the method attempts to load the transmission queues 298 (FIG. 11) of the physical channels so as to achieve a transmission time $T_p$ as close as possible to the ideal time transmission $T_i$ (step 332). Several transmission plans are generated in this fashion and the best plan is chosen from among them (step 334). Note that it may be desirable here to use a more complex optimization criterion. For example, it may be required to take into account session priorities and maximal acceptable delay variations per session.

There may be other conditions for transmission plan improvement in practice: (1) it may be required to decrease the suspension time of data units during the transmission process, to keep the memory buffer restrictions for data units on the transmission side and on the receiving side etc.; (2) during transmission scheduling, it may occur that only several data units are present in the input queue, without the presence of any large data blocks; new data units dynamically arrive at the input queue but there is insufficient enough information to optimize the transmission plan several loops ahead.

It is noted that the transmission plan generation scheme may not create an optimal plan for some criteria. The scheme is operative to improve the basic non-optimized data transmission mechanism and attempts to avoid the undesirable effects described supra. In particular, the transmission side can fully simulate the transmission process for the given block of data units, determine the required buffer capacities at each stage of the transmission process and modify the transmission plan for the steps which cause buffer requirements overflow on the transmission or on the receiving side.

Figure 15:
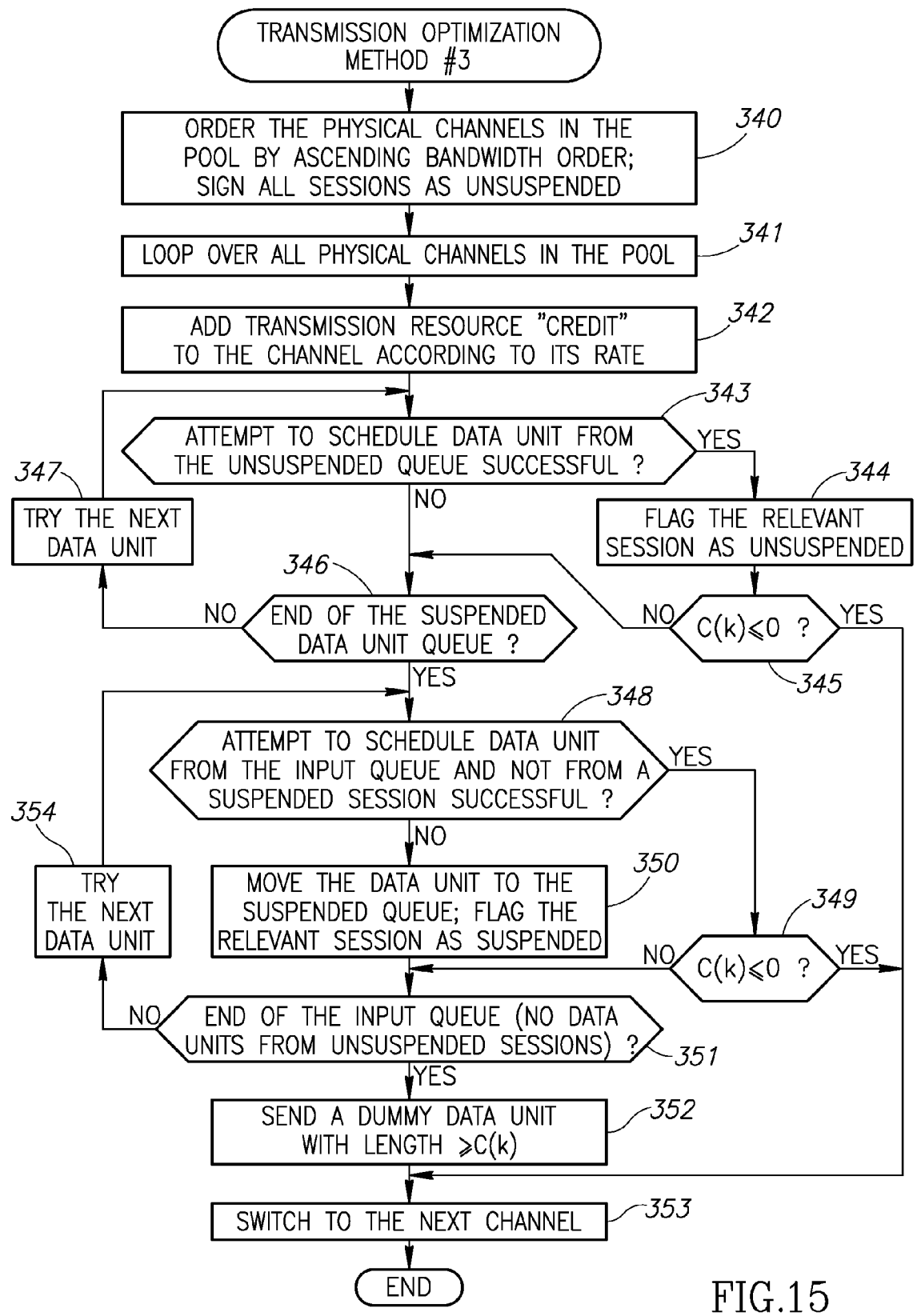
FIG. 15 is a flow diagram illustrating a third transmission optimization method of the present invention.

When there is insufficient information to optimize the transmission plan for several loops ahead, the following method is sufficiently effective. A flow diagram illustrating a third transmission optimization method of the present invention is shown in FIG. 15. The description of the operation of the plan uses the same terms and variables defined in the non-optimized transmission mechanism described supra. The method uses the following additional terms and variables provided in Table 2 below.

TABLE 2

Additional Definitions

| Term | Definition |
| --- | --- |
| Suspended Data Units Queue | An additional queue for storing suspended data units. It is initialized empty when the transmission plan is first created. |
| Transmission Sessions ($S_1$-$S_r$) | The r independent data sessions in the input data stream. |
| Suspended Session Flags ($F_1$-$F_r$) | Suspended session flags are per session; they are Boolean variables wherein a 'true' value indicates sessions containing data units that are currently waiting in the suspended data units queue; a 'false' value indicates sessions that do not have data units waiting in the suspended data queue. |
| a in T value limit | A parameter for T value restriction. |
| b in Tail Transmission Limit | A parameter that restricts in restriction for the maximal data unit 'tail' length that remains for the subsequent transmission loop. |

Note that preferably the value of the period T is set large enough to allow for the maximum length data unit to be transmitted at least on several of the physical channels in the group for the time aT, where a is a constant parameter with value in the range of approximately $0.1<a<2$. Note also that the physical channels in the channel group are preferably ordered (although not required) with ascending bandwidths. Note further that the method avoids adding a data unit to the currently filled physical channel if after the adding the data unit, the tail (equal to $(-C(k))$) exceeds $bB(k)$ where b is a constant with a value in the range of approximately $0.5<b<2$.

A pseudo code listing of the third transmission optimization method is presented below in Listing 3.

Listing 3: Third transmission optimization method

```
/* Preliminary steps: */
order the channels in the pool in ascending bandwidth order;
initialize all sessions as unsuspended /* i.e. set F_i = 'false' for all sessions */;
1. Loop over all channels in the group: perform actions 2 -4 for the current channel.
/* The following actions are performed after switching to channel k with bandwidth
        parameter B(k) and current Counter value C(k):*/
2. /* add transmission resource "credit" to the channel in accordance with its rate */
if (C(k) ≦ 0)
/* channel #k has data from the previous transmission loop */
        C(k) = C(k) + B(k);
else
/* channel #k was not fully busy in the past period (no input data units); note that such
"pauses" of data do not happen in the case of MPEG data which is sent continuously */
        C(k) = B(k);
3a. while (C(k) > 0) { /* executing in the internal loop */
/* continue channel usage */
            if (the suspended data units queue is empty) {
                exit loop 3a;
            } /* end if */
            consider the first data unit in the suspended data units queue including its session
            S_i and its length D(j);
            /* check if after adding this data unit the tail for transmission in the next loop(s) is
            absent or does not exceed the specified tail limit */
            if (D(j) – C(k)) < bB(k) {
                send the current data unit for handling to physical channel #k;
                C(k) = C(k) – D(j);
                U++;
                set F_i = 'false'; /* clear the flag of suspended data units for this session*/
            } /* end if */
        }/* end while */
3b. while (C(k) > 0) { /* executing in the internal loop */
/* continue channel usage */
            search the input queue for a data unit with session F_i = 'false' and length D(j);
            /* F_i = false indicates that there is no data unit suspended from this session */
            if (data unit found) {
                if (D(j) – C(k)) < bB(k) {;
                    send the current data unit for handling to physical channel #k;
                    C(k) = C(k) – D(j);
                    U++;
                }
                else {
                    /* the data unit of the current session is suspended, i.e. the session
                    is frozen (for scheduling purposes only and not for transmission) */
                    place the current data unit in the suspended data unit queue;
                    set F_i = 'true';
                }
            }
            else {
                /* a non-suspended data unit was not found in the input queue; this occurs for
                example if some sessions are blocked due to suspended data units and the
                remainder of the sessions have no data units in the input queue */
                /* sending a dummy data unit to physical channel #k triggers the method to switch
                to physical channel #(k+1) and begin resource allocation with that channel
                #(k+1). Typically, channel #(k+1) will have more free resources available for the
                waiting data units */
                send a dummy data unit with length C(k) to physical channel #k;
                C(k) =0;
            }
} /* end while */
4. Switch to the next physical channel and go to step 2 (external loop).
```

It is noted that B(k) it is not required that the value of B(k) be an integer, as it may contain fractional parts. As a result, there is no restriction in having a ratio of channel bandwidths represented by simple fractions like ⅗, etc. C(k) may also have non-integer values, which is preferred. Due to fractional values for B(k) and C(k) being permitted, the algorithms of the invention are better able to track the accumulated differences between channel bandwidths over many loops.

A description of the method is described with reference to FIG. 15. Initially, the physical channels are ordered by ascending bandwidth and all sessions are initialized to the unsuspended state (step 340). The method then loops over all physical channels in the pool (step 341). Note that this is the procedure performed to generate each transmission plan. A transmission resource 'credit' is added to the current physical channel under consideration in accordance with its associated rate (step 342). The method then attempts to allocate bandwidth for data units in the suspended queue (step 343). Preferably, data units are removed from the suspended data queue before data units are removed from the input queue.

If a data unit is successfully allocated for transmission over channel #k, its session becomes unsuspended and the session is flagged accordingly (step 344). If there is additional 'credit' for the channel (i.e. C(k)>0) (step 345), the loop continues and the next data unit is tried (step 347). Attempts to schedule data units from the suspended queue, whether successful or not, continue until the end of the suspended queue is reached (step 346). If no additional credit for a channel is available (step 345), the method switches to the next channel (step 353). Note that if a data unit cannot be sent over channel #k, it is likely to be able to be sent over channel #(k+1) since it may have a higher bandwidth or higher credit resource for the current transmission loop.

After all possible data units are removed from the suspended data unit queue and scheduled, the method attempts to send data units from the input queue (step 348). Note that only data units of non-suspended sessions may be removed from the input queue. If a data unit of a non-suspended session is found, the data unit is sent to the distributor 296 (FIG. 11) for scheduling (i.e. handling) to the current channel #k. It is then checked whether the physical channel has additional capacity (step 349). If so, the method attempts to schedule the next data unit in the input queue (step 354) until the end of the input queue is reached (step 351). If the physical channel does not have additional capacity (step 349), the method switches to the next physical channel (step 353).

If a data unit from the input queue that is not from a suspended session cannot be scheduled, then the data unit is moved to the suspended queue and the relevant session is flagged as suspended (step 350). The method continues to attempt to schedule data units from non-suspended sessions from the input queue (step 354) until the end of the input queue is reached (step 351). Once the end of the input queue is reached, a dummy data unit with length≧C(k) is sent over the current channel (step 352) and the method then switches to the next channel (step 353).

If there was a problem in allocating a data unit to the physical channel #k, such as if the tail for the subsequent data loop is too long, then the data unit is suspended. In addition, if the data unit of a session is suspended, all subsequent data units in that particular session are blocked from transmission (i.e. the session is suspended). Further, in the example provided herein, after switching to a new physical channel there may be more channel resources available. At this point, it is attempted to retry allocating suspended data units (i.e. typically having a longer length). The method attempts to allocate data units from the input queue only if there are not enough channel resources for the suspended data units.

Note also that in this example, switching to a new physical channel means switching to a channel with a higher bandwidth. This increases the probability of allocating suspended data units for transmission over the higher bandwidth channels.

Note further that on the receiving side it may be desirable in some situations to interrupt the reception of the current data unit, to flag the data unit as an error and to switch to the next physical channel for data receiving. Examples of such situations where this action may be desirable include: (1) transmission of a long data unit on a slow channel where the receiving buffers of other physical channels get close to their overflow levels; and (2) when the current situation appears to have suffered a traffic hit but the end of a data unit has not been detected. These actions help to avoid data buffer overflow in the receiver which can be significantly more harmful to the transmission process than the loss of a data unit.

In accordance with the invention, modifications to the algorithms presented above can be made as follows. First, an additional table per channel group is maintained in the distributor. This table comprises, for each destination ID (Service ID/Flow ID) a set of bits indicating which channels are acceptable for the particular data unit. Second, when a data unit is to be transmitted over channel k, the distributor, instead of taking the first data unit in the incoming queue, searches through the queue seeking a data unit that can be transmitted by channel k. If such a data unit exists in the queue, the distributor moves this unit to the channel k TX queue (otherwise it can queue an empty data unit).

This approach can change the order of transmission of the data units, but does not change the order of the data units for each Service ID. Note that this approach cannot be used on the MPEG level because the MPEG header does not contain any fields such as Service ID. One possible solution is to add a prefix to each MPEG for internal usage between MAC and Distributor and use it for Service ID indication.

It can be important for some specific data units to be delivered with minimal delay. For such situations, the input data unit queue before the distributor is replaced by two or more data queues. The distributor searches for the current data unit for handling at the high priority queue and only if there is nothing to transmit for the given channel k does it search the lower priority queues. Here the parameter T determines the typical delay of high priority packets transmission. Therefore, the expected delay can be changed by changing the T parameter for the group.

Figure 16:
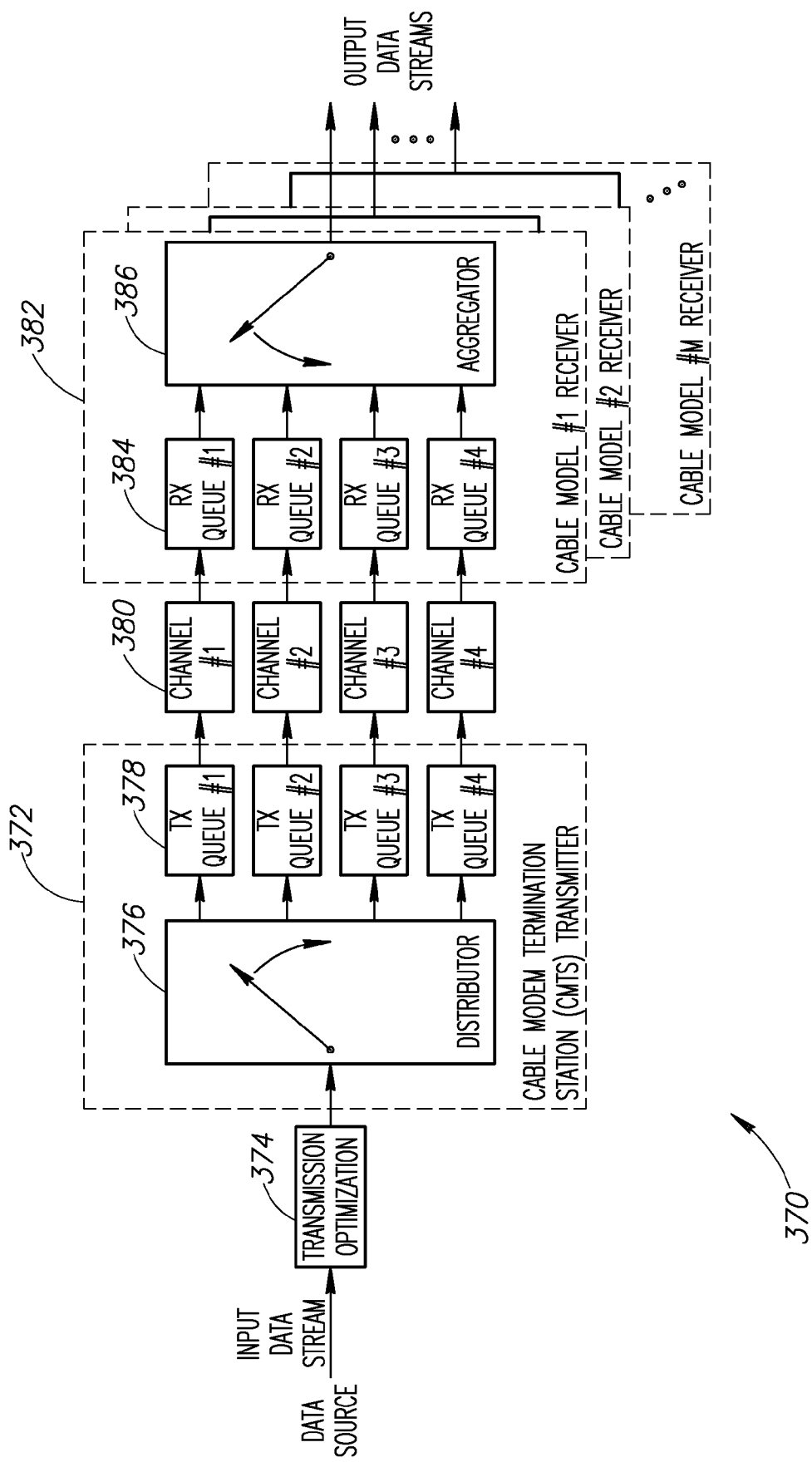
FIG. 16 is a block diagram illustrating an example embodiment constructed in accordance with the transmission optimization mechanism of the present invention adapted to operate in a DOCSIS communications system.

An example of the data transmission mechanism of the present invention as applied to a DOCSIS system will now be presented. A block diagram illustrating an example embodiment constructed in accordance with the transmission optimization mechanism of the present invention and adapted to operate in a DOCSIS communications system is shown in FIG. 16. The communication system, generally referenced 370, comprises a data source for providing an input data stream, transmitter 372, a plurality of four physical channels 380, a plurality of cable modem receivers 382 each adapted to generate four output data streams. The transmitter 372 comprises a transmission optimization block 374 constructed in accordance with the present invention and operative to generate a transmission plan for scheduling data units over the four physical channels, a distributor module 376 adapted to receive the data stream and queue control information (i.e. scheduling information) from the transmission optimization block and a plurality of four transmit queues 378 coupled to the distributor and to the physical channels 380. The receivers 382 each comprises a plurality of four receive queues 384 coupled to an aggregator 386. Each aggregator generates the output data stream to its own data sink.

In accordance with the invention, the distribution block on the transmitter side forwards the data units to the respective channels in accordance with the transmission plan generated by the transmission optimization block. The aggregation block on the receive side functions to collect and restore the order of the data units to generate a single output data stream. Note that the distributor and aggregators implement the same data unit distribution algorithm and associated parameters. The algorithm performed at the transmitter generates a sequence of actions that can be completely reproduced on the receive side. In a DOCSIS system, the transmitter is inside a cable modem termination station (CMTS). On the other end of the link, a plurality of M receivers, each located in a different cable modem operate in parallel to generate M output data streams.

In the context of a DOCSIS system, the data transmission scheme of the present invention is operative not only in the downstream but in the upstream as well. In a DOCSIS network, the Upstream (US) protocol is more complicated than the Downstream (DS) protocol. The need to provide multi-channel transmission in the US direction is typically less than that for the DS. In accordance with the invention, in order to provide multi-channel transmission in the US direction, several US channels are fully dedicated for a particular cable modem. For example, a plurality of channels may be dedicated in a modem by not sending initial ranging opportunities after transmission session starts for the upstreams to be dedicated for use as a channel group. Thus, one or more upstreams are dedicated and monopolizing for data transmission in accordance with the invention. This prevents other modems from connecting to these upstreams. This permits the data transmission scheme to be used for upstream multi-channel transmission as well as downstream transmission. Preferably, unsolicited grant (USG) is employed in this case.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An apparatus for optimizing data transmission over a channel group having a plurality of physical channels, comprising:
   an input queue for receiving an input stream of data units to be transmitted over said channel group;
   a suspended queue for storing data units retrieved from said input queue but not able to be sent over a particular channel;
   a transmission plan generator operative to:
   generate a plurality of transmission plans wherein each transmission plan includes a schedule for transmitting data units over each physical channel;
   generate said schedule by attempting to transmit data units previously placed in said suspended queue, attempting to send unsuspended data units in said input queue over a first channel in said channel group, and if said unsuspended data units cannot be sent, placing said unsuspended data units in said suspended queue for transmission over a different channel wherein said different channel has a greater bandwidth than a bandwidth associated with said first channel;
   select a best transmission plan from said plurality of transmission plans based on one or more optimization criteria; and
   transmit scheduled data units over said channel group in accordance with said selected transmission plan.

2. The apparatus according to claim 1, further comprising a distributor operative to receive data units for transmission and to receive corresponding control information for placing said data units received by said distributor in one of a plurality of transmit queues, each transmit queue associated with a physical channel.

3. The apparatus according to claim 2, wherein said distributor comprises means for maintaining a counter value for each channel whereby transmission over a channel only occurs if the value of the counter associated therewith is greater than zero.

4. The apparatus according to claim 1, wherein said plurality of physical channels comprises physical channels having arbitrary bandwidth.

5. The apparatus according to claim 1, wherein transmission of data over said channel group appears as transmission over a single logical channel having a bandwidth approximately equal to a sum of bandwidths of said plurality of channels.

6. The apparatus according to claim 1, adapted to be implemented in a Data-Over-Cable Service Interface Specification (DOCSIS) enabled communications system.

7. The apparatus according to claim 1, adapted to be implemented in a cable modem termination system (CMTS) unit in a Data-Over-Cable Service Interface Specification (DOCSIS) enabled communications system.

8. The apparatus according to claim 1, further comprising means for assigning a transmission credit to each channel during each cycle through the channels in said channel group in accordance with its transmission capacity so as to provide load balancing.

* * * * *